US012791740B1

(12) United States Patent
Disney et al.

(10) Patent No.: US 12,791,740 B1
(45) Date of Patent: Nov. 10, 2026

(54) MODULAR SCINTILLATION DETECTOR ASSEMBLY WITH INTEGRATED CIRCUIT BOARD

(71) Applicant: RONAN ENGINEERING COMPANY, Florence, KY (US)

(72) Inventors: Stephen E. Disney, Nicholasville, KY (US); Alexander Podolsky, Loveland, OH (US)

(73) Assignee: RONAN ENGINEERING COMPANY, Florence, KY (US)

( * ) Notice: Subject to any disclaimer, the term of this patent is extended or adjusted under 35 U.S.C. 154(b) by 0 days.

(21) Appl. No.: 19/569,009

(22) Filed: Mar. 17, 2026

Related U.S. Application Data

(60) Provisional application No. 63/773,553, filed on Mar. 18, 2025.

(51) Int. Cl.
*G01T 1/208* (2006.01)
*G01T 1/202* (2006.01)

(52) U.S. Cl.
CPC .............. *G01T 1/208* (2013.01); *G01T 1/202* (2013.01)

(58) Field of Classification Search
CPC .... G01T 1/20; G01T 1/36; G01T 1/17; G01T 1/164
See application file for complete search history.

(56) References Cited

U.S. PATENT DOCUMENTS 6,300,624 B1 * 10/2001 Yoo .......................... G01V 5/04 250/254
2011/0168899 A1 * 7/2011 Cheshire ............... G01F 23/288 250/357.1

* cited by examiner

*Primary Examiner* — Courtney D Thomas
(74) *Attorney, Agent, or Firm* — FBT Gibbons LLP

(57) ABSTRACT

A scintillation detector assembly includes a detector housing, a scintillation crystal, a photomultiplier tube optically coupled to the crystal, and a circuit board assembly electrically connected to the photomultiplier tube. The circuit board assembly comprises a single printed circuit board integrating a high voltage power supply circuit, a preamplifier circuit, and a pulse processing circuit. A shield is positioned adjacent to the photomultiplier tube.

20 Claims, 21 Drawing Sheets

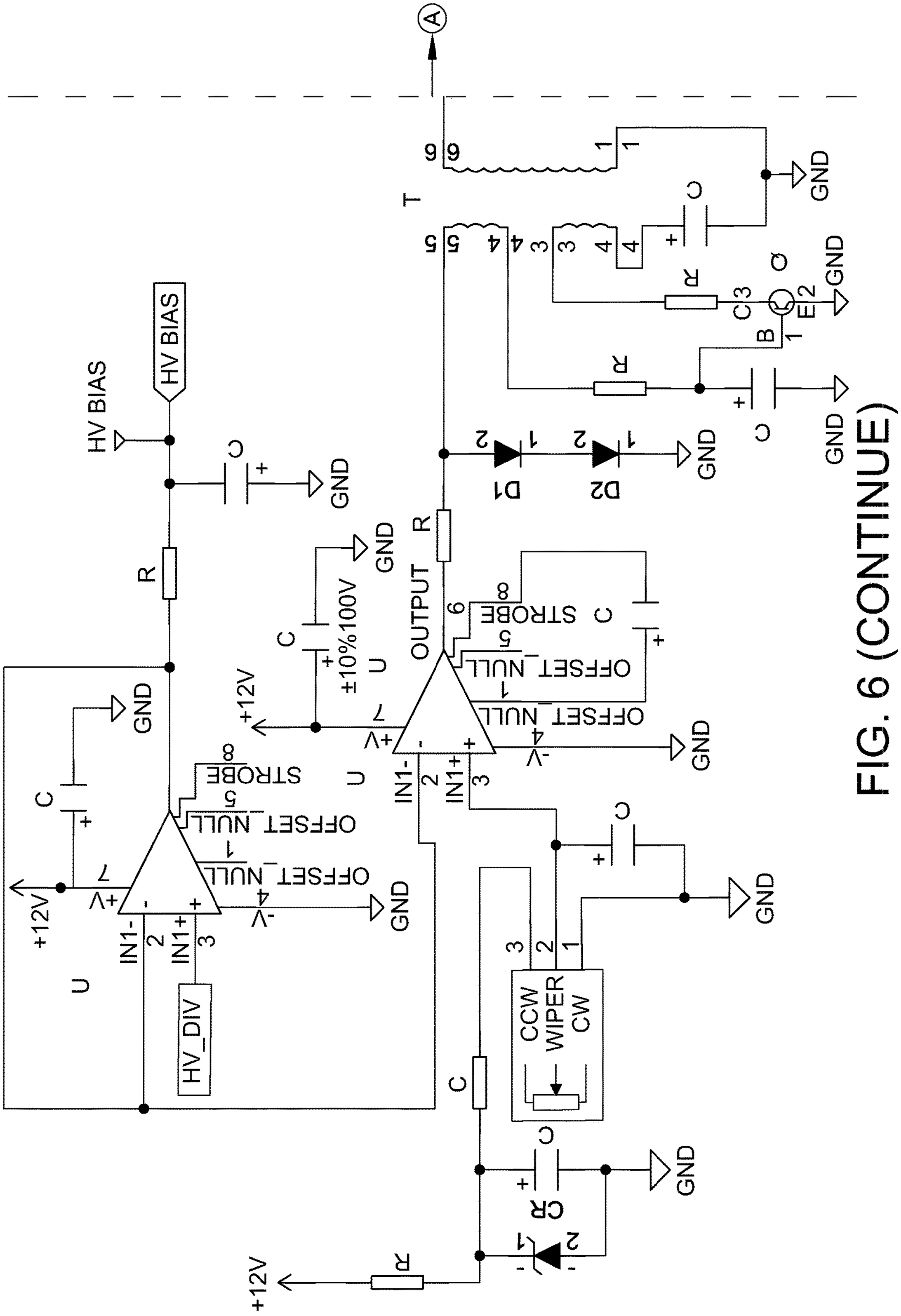
FIG. 6 (CONTINUE)

MODULAR SCINTILLATION DETECTOR ASSEMBLY WITH INTEGRATED CIRCUIT BOARD

CROSS-REFERENCE TO RELATED APPLICATIONS

This application claims priority to U.S. Application No. 63/773,553, titled MODULAR SCINTILLATION DETECTOR ASSEMBLY WITH INTEGRATED CIRCUIT BOARD, filed Mar. 18, 2025, which is hereby incorporated by reference in its entirety.

FIELD OF INVENTION

The present disclosure relates to scintillation detector systems for industrial measurement applications which have a modular housing configuration.

BACKGROUND

Scintillation detectors are used in industrial applications to measure process and material characteristics such as levels, locations, or densities of fluids, solids, emulsions, or other materials located within reservoirs, tanks, or pipes. These detectors typically employ a radiation source, often X-rays or gamma energy, which passes through the material being measured before impacting a detector. The detector contains a scintillation crystal or fluid that produces light flashes when struck by gamma radiation. These light flashes are then detected and analyzed to determine properties of the material through which the radiation passed.

BRIEF DESCRIPTION OF FIGURES

While the specification concludes with claims particularly pointing out and distinctly claiming the present invention, it is believed that the same will be better understood from the following description taken in conjunction with the accompanying drawings in which:

DETAILED DESCRIPTION

Figure 1:
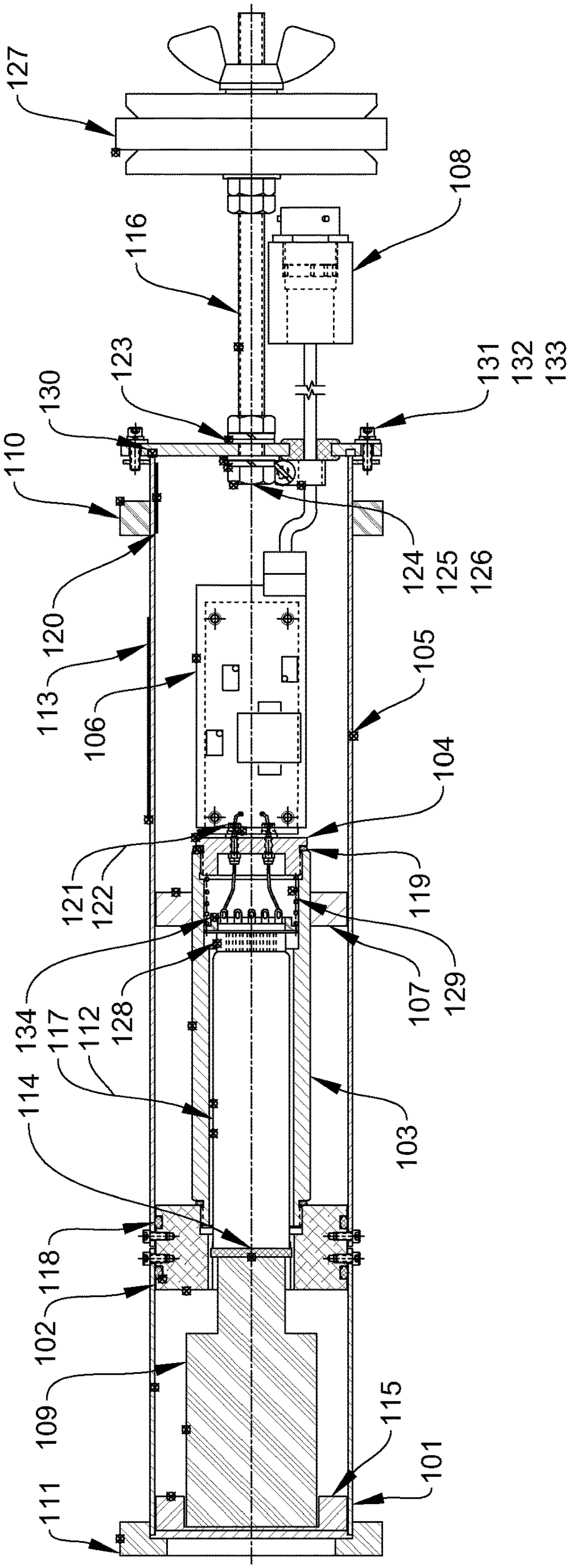
FIG. 1 illustrates a section view of a scintillation detector assembly according to one non-limiting embodiment.

Certain embodiments are hereinafter described in detail in connection with the views and examples of FIGS. 1-20, wherein like numbers illustrate like elements throughout the views. A detector system can be provided to measure any of a variety of process or material characteristics such as, for example, levels, locations or densities of fluids, solids, emulsions or other material as can be located within reservoirs, tanks or pipes. The detector system can include a detection unit. A radiation source can emit energy which passes through the tank or pipe and then impacts the detection unit. Process or material characteristics can be determined by monitoring the manner in which the energy from the radiation source passes through the fluid and impacts the detection unit. More particularly, upon impact of the energy with the detection unit, scintillations of light can occur within the detection unit. A scintillation detector within the detection unit can detect the scintillations and provide corresponding data to a processor unit. The processor unit can process this data to determine characteristics of the material through which the energy has passed and can facilitate display or transmission of data or signals identifying the determined characteristics. Such characteristics can include, for example, levels, locations or densities of fluids, solids, emulsions or other material as can be located within reservoirs, tanks or pipes.

Detector systems can be provided in industrial or commercial applications where flammable or combustible materials are present. Accordingly, in certain applications, components of the detector systems can be required to be provided within an external housing having an explosion-proof rating or construction. By providing a detector system in such a configuration, it will be appreciated that the various components of the detector system can be capable of withstanding an internal explosion without allowing hot gases or flames to escape from the various components which would otherwise possibly trigger an explosion in the surrounding atmosphere. "Explosion-proof" is a term used by national rating agencies such as Underwriters Laboratories and Factory Mutual Research in order to indicate their certification that a component has met their specifications and passed their tests. For a device to be explosion-proof, it typically must be provided with a sturdy and thick-walled housing.

Select examples of suitable external housings and configurations can be seen in U.S. Pat. App. Pub. 2011/0168899, the entire disclosure of which is hereby incorporated herein in its entirety.

Scintillation detector systems may be used in industrial applications to measure process and material characteristics such as levels, locations, or densities of fluids, solids, emulsions, or other materials located within reservoirs, tanks, or pipes. These detector systems may employ a radiation source, such as X-rays or gamma energy emitted by Cesium-137, which passes through the material being measured before impacting a detection unit. The detection unit may contain a scintillation crystal or fluid that produces light flashes when struck by gamma radiation. These light flashes may then be detected and analyzed to determine properties of the material through which the radiation passed.

Traditional scintillation detector systems may utilize multiple separate circuit boards interconnected with cables and connectors to perform various functions including high voltage power supply, signal amplification, discrimination, and pulse processing. This multi-board approach may present challenges in manufacturing complexity, reliability, and serviceability. The interconnections between separate boards may introduce potential failure points and may increase susceptibility to electromagnetic interference that could compromise measurement accuracy. Additionally, troubleshooting and replacing components in traditional systems may require accessing and servicing multiple boards, which may complicate field maintenance procedures.

The following description sets forth exemplary aspects of the present disclosure. It should be recognized, however, that such a description is not intended as a limitation on the scope of the present disclosure. Rather, the description also encompasses combinations and modifications to those exemplary aspects described herein. The scintillation detector systems described herein may incorporate various components including scintillation crystals, photomultiplier tubes, signal processing electronics, and shielding elements. These components may be arranged in modular assemblies that can be configured for specific measurement requirements. The modular nature of the assemblies may allow for field-replaceable components and simplified maintenance procedures.

Scintillation detector systems in accordance with the present disclosure may incorporate a modular housing configuration with an integrated circuit board assembly that consolidates multiple functions onto a single board. This integrated approach may simplify the manufacturing process by reducing the number of separate components and interconnections that need to be assembled. The consolidated design may improve reliability by reducing the number of potential failure points associated with cables, connectors, and inter-board connections.

The integrated circuit board assembly may be designed to handle both high voltage and low voltage elements on the same board, creating a compact and efficient solution for industrial environments. The circuit board assembly may maintain electrical isolation between high voltage sections used for photomultiplier tube operation and sensitive low voltage signal processing sections. This consolidated design approach may enable the detector system to be housed within explosion-proof enclosures while maintaining signal integrity and reducing susceptibility to electromagnetic interference.

The modular nature of the detector assemblies may allow for field-replaceable components and simplified maintenance procedures. The integrated circuit board assembly may facilitate easier maintenance, troubleshooting, and replacement compared to traditional systems. In some cases, the circuit board assembly may be removed and replaced as a single unit, reducing the time and complexity associated with servicing the detector system in the field. The modular design may also allow for adaptation to various measurement scenarios or environmental conditions by enabling different housing configurations to be used with compatible circuit board assemblies.

Referring to FIG. 1, a scintillation detector assembly in accordance with one embodiment is illustrated in a section view. The scintillation detector assembly includes a detector housing 101 that may contain and support various internal components. A coupling 102 and a shield 103 may be positioned within the detector housing 101, with the shield 103 providing shielding for a photomultiplier tube (PMT) 117.

The scintillation detector assembly may include a cover assembly 104 and a housing 105 that enclose a circuit board assembly 106. A ring 107 may be positioned within the housing 105, and a cable assembly 108 may extend from one end of the scintillation detector assembly to provide electrical connectivity. A crystal 109 may be situated near one end of the scintillation detector assembly, and a scintillation detector shield 112 may provide additional electromagnetic protection for the crystal 109. The scintillation detector assembly may include various support rings, such as an upper support ring 110 and a lower support ring 111, which may provide structural support for internal components.

With continued reference to FIG. 1, the scintillation detector assembly may incorporate several sealing and mounting components including a gasket 118, a gasket 119, and a gasket 130. An optical coupling 114 may be positioned between the crystal 109 and the PMT 117 to facilitate transmission of scintillation light from the crystal 109 to the PMT 117. A crystal support ring 115 may provide additional support for the crystal 109 within the structure.

A support rod 116 may extend through portions of the scintillation detector assembly to provide structural rigidity. A socket 128 and a compression spring 129 may be arranged to support and position the PMT 117 within the detector housing 101. The compression spring 129 may maintain proper contact and positioning between the PMT 117 and adjacent components. The scintillation detector assembly may include various fastening components including screws 121, 131 washers 122, 123, 125, 126, 132, 133, and a nut 124. These fastening components may secure the various elements of the scintillation detector assembly together.

As further shown in FIG. 1, a lower pressure test plug 127 may be incorporated into the scintillation detector assembly to allow for pressure testing of the sealed enclosure. A spacer 134 may provide proper spacing between components within the detector housing 101. A label 113 and a label 120 may be affixed to the exterior of the scintillation detector assembly for identification purposes.

The components of the scintillation detector assembly may be arranged in a coaxial configuration, with the crystal 109, the PMT 117, and the circuit board assembly 106 substantially aligned along a central axis. This coaxial arrangement may allow for efficient detection and processing of scintillation events while maintaining proper shielding and environmental protection. In some cases, the circuit board assembly 106 may be positioned off-center of the coaxial axis within the detector housing 101, which may accommodate space constraints or routing of electrical connections.

The detector housing 101 may support two different PMT lengths, such as 19 mm×44 mm and 19 mm×24 mm, although this disclosure is not so limited. This capability may allow the scintillation detector assembly to be configured with different PMT sizes depending on application requirements. In some cases, the detector housing 101 may use a threaded coaxial body style for light-tightness, which may prevent ambient light from entering the detector housing 101 and interfering with detection of scintillation events at the PMT 117.

Figure 2:
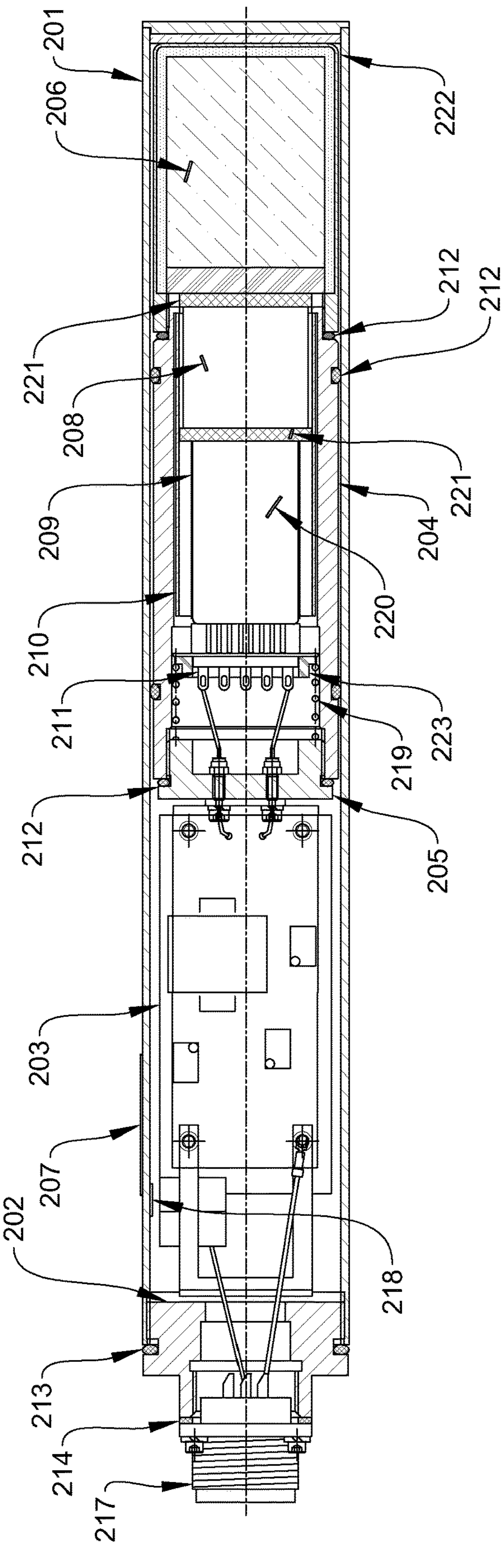
FIG. 2 illustrates a sectional view of a scintillation detector assembly according to one non-limiting embodiment.

Referring to FIG. 2, a scintillation detector assembly in accordance with another embodiment is illustrated in a sectional view. The scintillation detector assembly includes a detector housing 201 that may contain and protect internal components. A detector cover 202 may be positioned at one end of the detector housing 201 to provide access to internal components and to seal the detector housing 201.

A circuit board assembly 203 may be positioned within the detector housing 201 and may contain electronic components for signal processing. The circuit board assembly 203 may integrate multiple functions onto a single board, similar to the circuit board assembly 106 described with reference to FIG. 1. A PMT shield 204 and a cover 205 may provide shielding for internal components within the detector housing 201. The PMT shield 204 may protect a PMT 220 from electromagnetic interference that could affect detection accuracy.

A crystal 206 may be positioned within the scintillation detector assembly near one end of the detector housing 201. The crystal 206 may produce light flashes when struck by radiation that has passed through a material under measurement. A label 207 may be provided on the exterior of the scintillation detector assembly for identification purposes.

With continued reference to FIG. 2, the scintillation detector assembly may include a light pipe crystal 208 positioned within the assembly. The light pipe crystal 208 may facilitate transmission of scintillation light from the crystal 206 toward the PMT 220. A short shield 209 may be positioned adjacent to the light pipe crystal 208 to provide localized shielding.

The scintillation detector assembly may include a magnetic field shield 210 to provide additional electromagnetic shielding for sensitive components. The magnetic field shield 210 may protect the PMT 220 from external magnetic fields that could interfere with photomultiplier tube operation. A socket 211 may be included within the scintillation detector assembly for electrical connections between the circuit board assembly 203 and the PMT 220.

Multiple gaskets may be positioned at various locations throughout the scintillation detector assembly to provide sealing. Gaskets 212, 213, 214 may be positioned at different interfaces within the detector housing 201 to prevent ingress of moisture, dust, or other contaminants. A cable assembly 217 may extend from one end of the scintillation detector assembly to enable electrical connectivity with external electronics or power supplies. A label 218 may provide additional identification on the exterior of the scintillation detector assembly.

As further shown in FIG. 2, a compression spring 219 may be positioned within the scintillation detector assembly to maintain proper contact and positioning between components. The compression spring 219 may provide mechanical support for the PMT 220 and may ensure stable electrical connectivity between the PMT 220 and the socket 211. The PMT 220 may be housed within the detector housing 201 and may connect to the socket 211 for electrical communication with the circuit board assembly 203.

An optical coupling 221 may be positioned between the crystal 206 and the PMT 220 to facilitate light transmission from scintillation events occurring within the crystal 206. A spacer 222 and a spacer 223 may be incorporated within the scintillation detector assembly to maintain proper component positioning and spacing within the detector housing 201.

The components of the scintillation detector assembly may be arranged in a coaxial configuration within the detector housing 201. The crystal 206, the light pipe crystal 208, the optical coupling 221, and the PMT 220 may be substantially aligned along a central axis. The various shields, gaskets, and spacers may work together to provide proper alignment, sealing, and protection of the sensitive internal components. In some configurations, the circuit board assembly 203 may be positioned off-center of the coaxial axis to accommodate space constraints or routing of electrical connections within the detector housing 201.

Figure 3:
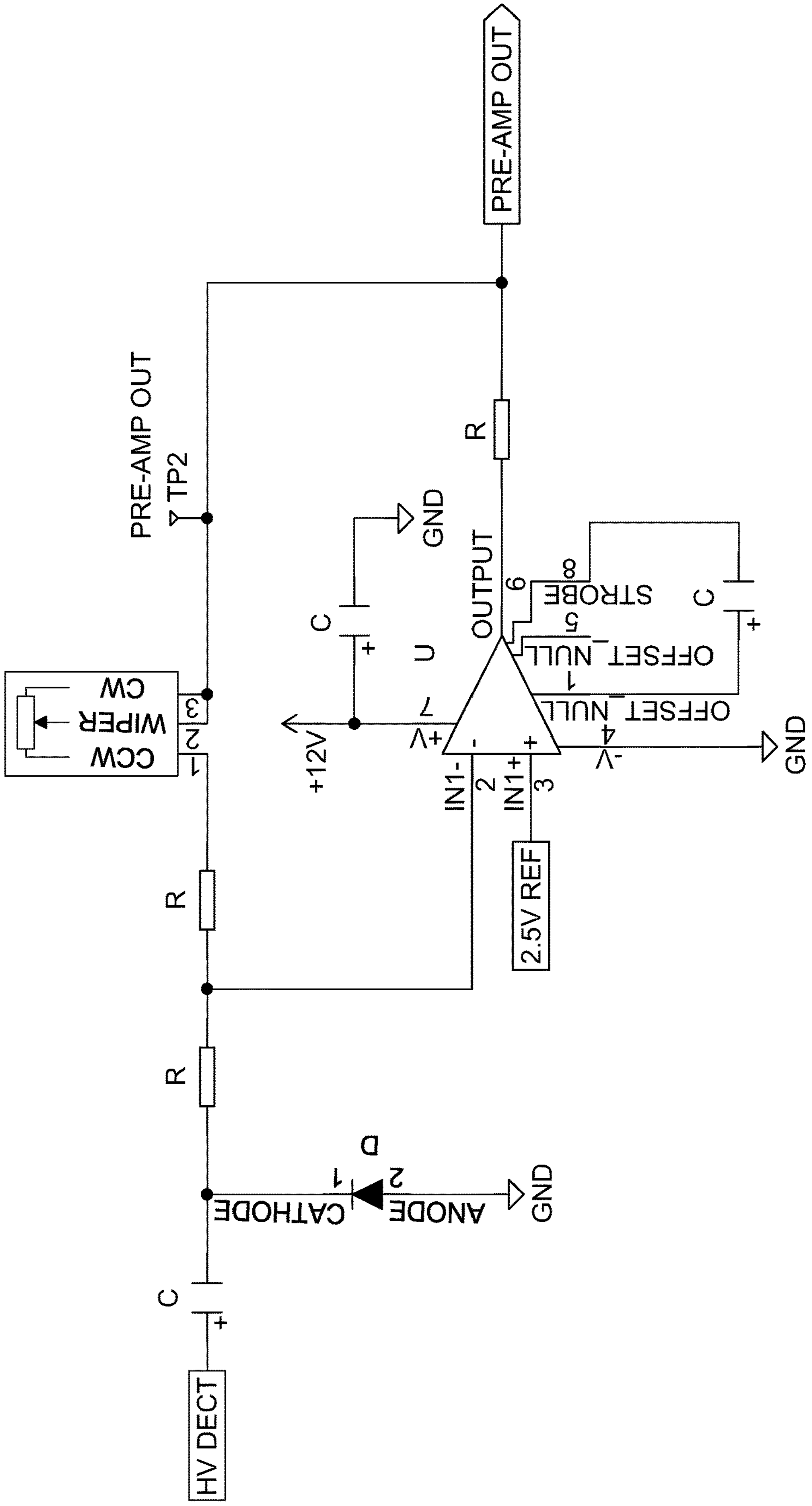
FIG. 3 illustrates a preamplifier circuit for processing signals from a detector according to one non-limiting embodiment.

Referring to FIG. 3, a preamplifier circuit for processing signals from a high voltage detector is illustrated in accordance with one embodiment. The preamplifier circuit may receive an input signal from the high voltage detector through a coupling capacitor positioned at an input stage of the preamplifier circuit. The coupling capacitor may block direct current components from the high voltage detector while allowing alternating current signal components to pass through to subsequent stages of the preamplifier circuit.

The preamplifier circuit may include a diode connected between the input signal path and ground to provide protection against voltage spikes. The diode may clamp transient voltage events that could otherwise damage downstream components within the preamplifier circuit. When a voltage spike exceeds a threshold voltage of the diode, the diode may conduct current to ground, thereby limiting the voltage that reaches subsequent circuit stages.

With continued reference to FIG. 3, the preamplifier circuit may include a resistor network comprising resistors connected along the signal path. A potentiometer may be connected to the signal path, with a wiper terminal of the potentiometer providing an adjustable connection point. This configuration may allow for adjustment of a signal level at an intermediate output stage of the preamplifier circuit.

The preamplifier circuit may incorporate an operational amplifier configured with negative feedback. An inverting input of the operational amplifier may receive a processed detector signal, while a non-inverting input of the operational amplifier may be connected to a reference voltage. In some cases, the reference voltage may be approximately 2.5 volts. The operational amplifier may be powered by a positive supply voltage connected to a positive supply pin of the operational amplifier. Bypass capacitors may be connected between supply pins of the operational amplifier and ground to filter noise and improve stability of the operational amplifier.

As further shown in FIG. 3, an output section of the preamplifier circuit may include a resistor connected between an output of the operational amplifier and a preamplifier output terminal. The output resistor may provide current limiting or impedance matching for a preamplifier output signal. The operational amplifier may amplify a difference between the input signal and the reference voltage, producing a conditioned output signal suitable for further processing by downstream discriminator circuitry. The bypass capacitors positioned near the power supply pins of the operational amplifier may help maintain stable operation by filtering high-frequency noise from power supply lines.

Figure 4:
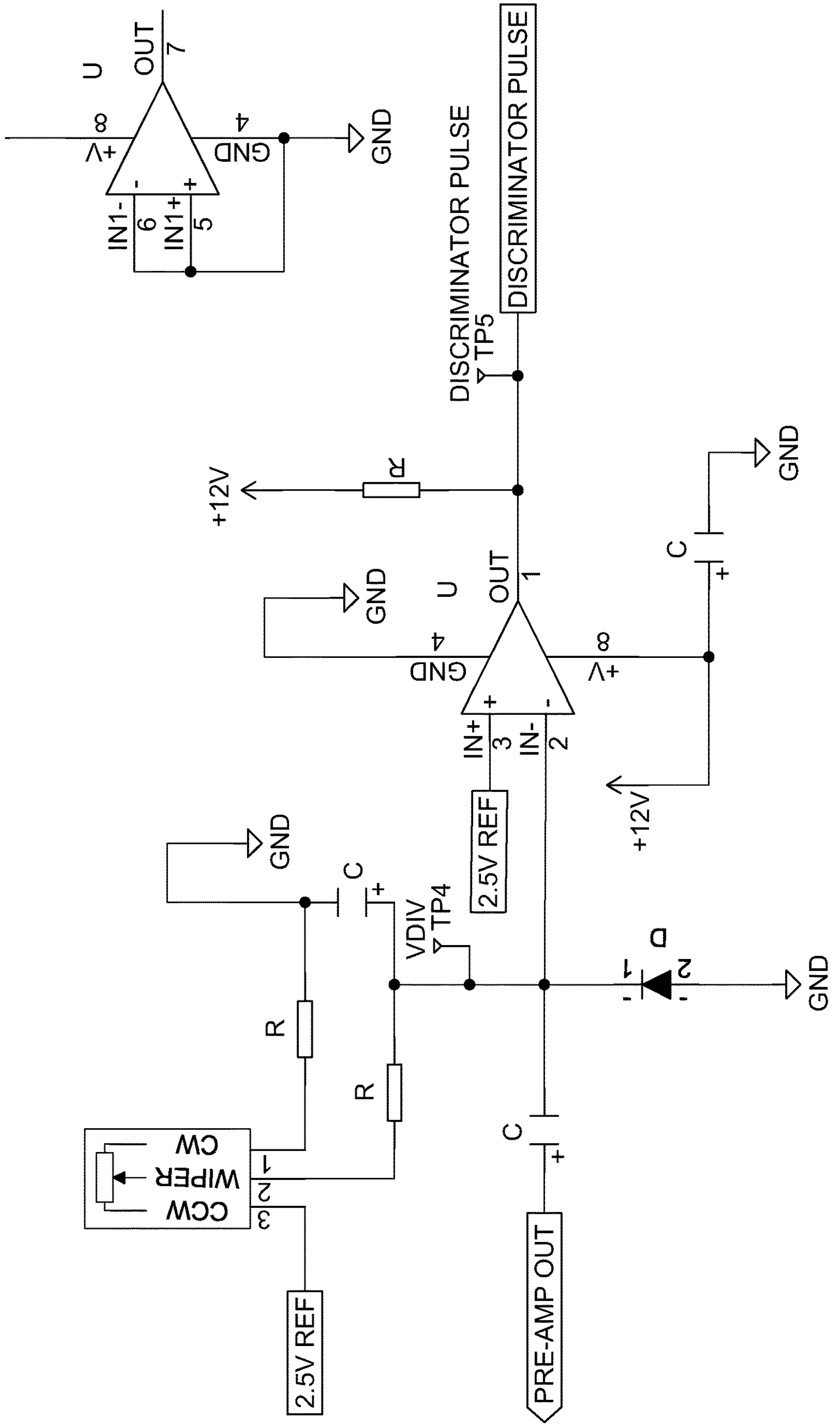
FIG. 4 illustrates a discriminator circuit for processing signals from a radiation detector according to one non-limiting embodiment.

Referring to FIG. 4, a discriminator circuit for processing signals from the preamplifier circuit is illustrated in accordance with one embodiment. The discriminator circuit may receive an input signal from a preamplifier output terminal and may process the input signal to generate a standardized output pulse when the input signal exceeds a reference threshold.

The discriminator circuit may include a coupling capacitor connected between the preamplifier output terminal and a signal processing node within the discriminator circuit. The coupling capacitor may block direct current components while allowing alternating current signal components from the preamplifier circuit to pass through to subsequent stages of the discriminator circuit. A diode may be connected between the signal processing node and ground to provide protection against voltage transients that could damage downstream components.

With continued reference to FIG. 4, the discriminator circuit may include a resistive voltage divider network connected to a reference voltage source. In some cases, the reference voltage source may provide approximately 2.5 volts. A potentiometer may be included within the voltage divider network to provide adjustable threshold control. The voltage divider network may output a threshold voltage at a VDIV test point TP4, which may allow for monitoring and adjustment of a discrimination threshold voltage. The VDIV test point TP4 may be accessible for calibration purposes, enabling adjustment of the threshold at which the discriminator circuit generates an output pulse.

The discriminator circuit may include a first operational amplifier configured as a voltage comparator. A non-inverting input of the first operational amplifier may be connected to the reference voltage source, and an inverting input of the first operational amplifier may receive the processed detector signal through the coupling capacitor. The first operational amplifier may be powered by a positive supply voltage, such as 12 volts, with bypass capacitors connected between power supply pins of the first operational amplifier and ground for noise filtering and stability.

As further shown in FIG. 4, an output of the first operational amplifier may connect through a resistor to a second operational amplifier, which may also be configured as a comparator stage. The second operational amplifier may have a non-inverting input receiving the signal from the first operational amplifier stage and an inverting input connected to a reference. The second operational amplifier may be powered by a positive supply voltage with associated bypass capacitors connected to ground.

An output of the second operational amplifier may provide a discriminator pulse test point TP5. The discriminator pulse test point TP5 may be labeled as a discriminator pulse output. When an input signal from the preamplifier circuit exceeds the adjustable reference threshold set at the VDIV test point TP4, the discriminator circuit may generate a standardized output pulse at the discriminator pulse test point TP5. The dual comparator configuration of the discriminator circuit may provide enhanced noise immunity and may generate clean digital pulses suitable for subsequent pulse processing circuitry within the circuit board assembly 106 or the circuit board assembly 203.

Figure 5:
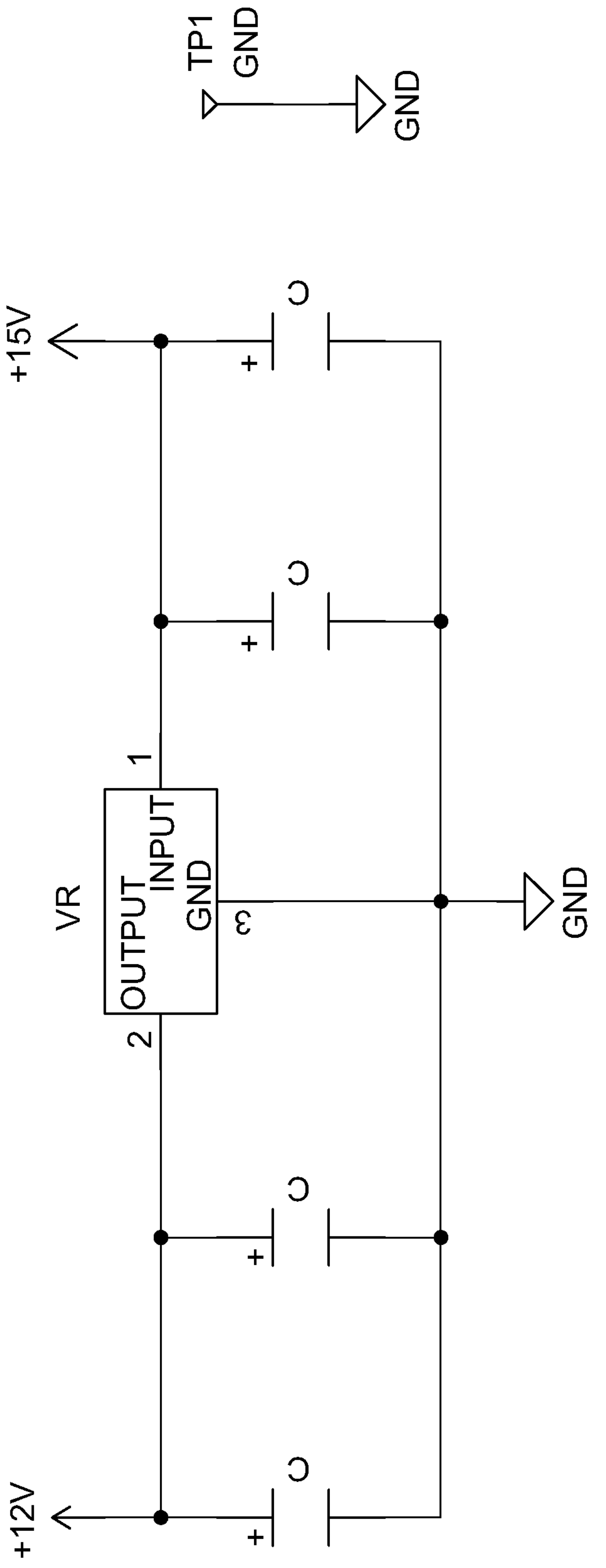
FIG. 5 illustrates a voltage regulation circuit for providing regulated power according to one non-limiting embodiment.

Referring to FIG. 5, a voltage regulation circuit for providing regulated power to electronic components is illustrated in accordance with one embodiment. The voltage regulation circuit may be incorporated within the circuit board assembly 106 or the circuit board assembly 203 to provide stable power for signal processing components within the scintillation detector assembly.

The voltage regulation circuit may include a voltage regulator configured to convert a higher input voltage to a regulated lower output voltage. The voltage regulator may have an input pin 1 connected to a positive supply rail, an output pin 2 connected to a regulated output rail, and a ground pin 3 connected to a common ground reference. In some cases, the input pin 1 may receive a positive 15 volt supply, and the output pin 2 may provide a regulated positive 12 volt output. The ground pin 3 may establish a common reference potential for the voltage regulation circuit.

With continued reference to FIG. 5, multiple capacitors may be connected between the respective voltage lines and ground to filter noise and improve transient response of the voltage regulation circuit. On an input side of the voltage regulator, capacitors may be connected between the positive supply rail and ground to provide input filtering and decoupling. The input capacitors may reduce noise present on the input supply rail and may help maintain stable operation of the voltage regulator during transient load conditions.

On an output side of the voltage regulator, capacitors may be connected between the regulated output rail and ground to provide output filtering and stabilization. The output capacitors may smooth the regulated output voltage and may improve transient response when load current demands change rapidly. In some cases, the capacitors may be electrolytic or tantalum types suitable for power supply filtering applications, as indicated by polarity markings on the capacitors.

As further shown in FIG. 5, a test point may be provided and connected to the ground reference, allowing for measurement and verification of the ground potential during testing or troubleshooting of the voltage regulation circuit. The voltage regulation circuit may receive the higher input voltage at the input pin 1, regulate the input voltage through the voltage regulator, and provide a stable lower voltage output at the output pin 2. The regulated output voltage may power sensitive electronic components within the circuit board assembly 106 or the circuit board assembly 203, including operational amplifiers within the preamplifier circuit and the discriminator circuit described with reference to FIG. 3 and FIG. 4.

Figure 6:
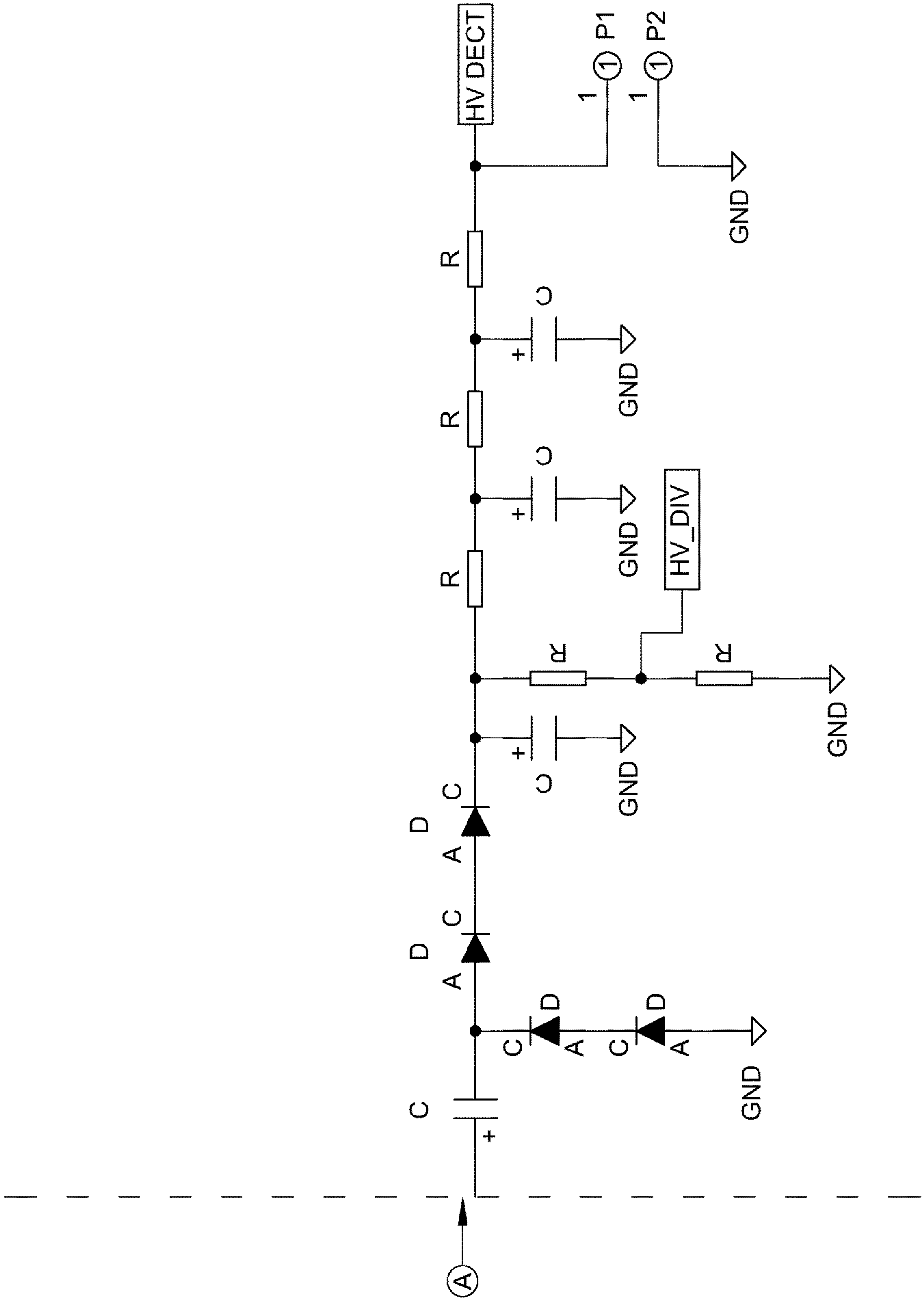
FIG. 6 illustrates a high voltage power supply circuit for a photomultiplier tube according to one non-limiting embodiment.

Referring to FIG. 6, a high voltage power supply circuit for providing regulated voltage to a photomultiplier tube is illustrated in accordance with one embodiment. The high voltage power supply circuit may be incorporated within the circuit board assembly 106 or the circuit board assembly 203 to provide operating voltage for the PMT 117 or the PMT 220 within the scintillation detector assembly.

The high voltage power supply circuit may include a dual operational amplifier configuration with MOSFET inputs arranged as an oscillator. The dual operational amplifier configuration may generate an oscillating signal that drives a step-up transformer within the high voltage power supply circuit. The oscillator arrangement may convert a lower voltage direct current input into an alternating current signal suitable for voltage transformation by the step-up transformer.

With continued reference to FIG. 6, the step-up transformer may receive the oscillating signal from the dual operational amplifier configuration and may increase the voltage amplitude to levels suitable for photomultiplier tube operation. The transformer may be shielded and tied to ground to minimize electromagnetic interference. This shielding and grounding arrangement may prevent coupling of high-frequency noise into adjacent signal processing circuits within the circuit board assembly 106 or the circuit board assembly 203. The shielded transformer configuration may reduce electromagnetic emissions that could otherwise interfere with sensitive low voltage signal processing sections of the circuit board assembly, such as the preamplifier circuit and the discriminator circuit described with reference to FIG. 3 and FIG. 4.

A secondary side of the step-up transformer may connect to a rectification and filtering network within the high voltage power supply circuit. The rectification and filtering network may comprise diodes and capacitors arranged to convert the stepped-up alternating current signal into a high voltage direct current output suitable for biasing the photomultiplier tube. The filtering components may smooth the rectified output to provide a stable high voltage supply.

As further shown in FIG. 6, a feedback path may be included within the high voltage power supply circuit to enable regulation of the high voltage output. The feedback path may include sampling of the high voltage output through a voltage divider network. The voltage divider network may reduce the high voltage output to a lower voltage level that may be compared against a reference within the dual operational amplifier configuration. This feedback arrangement may enable precise regulation of the high voltage output by adjusting the oscillator operation based on the sampled output voltage.

The voltage divider network within the feedback path may maintain isolation between the high voltage section and sensitive downstream components within the circuit board assembly. By sampling the high voltage output through resistive division, the feedback path may provide regulation information to the control circuitry without exposing low voltage components to the full high voltage potential. This isolation may protect the operational amplifiers and other low voltage components from damage while enabling closed-loop regulation of the photomultiplier tube bias voltage.

Figure 7:
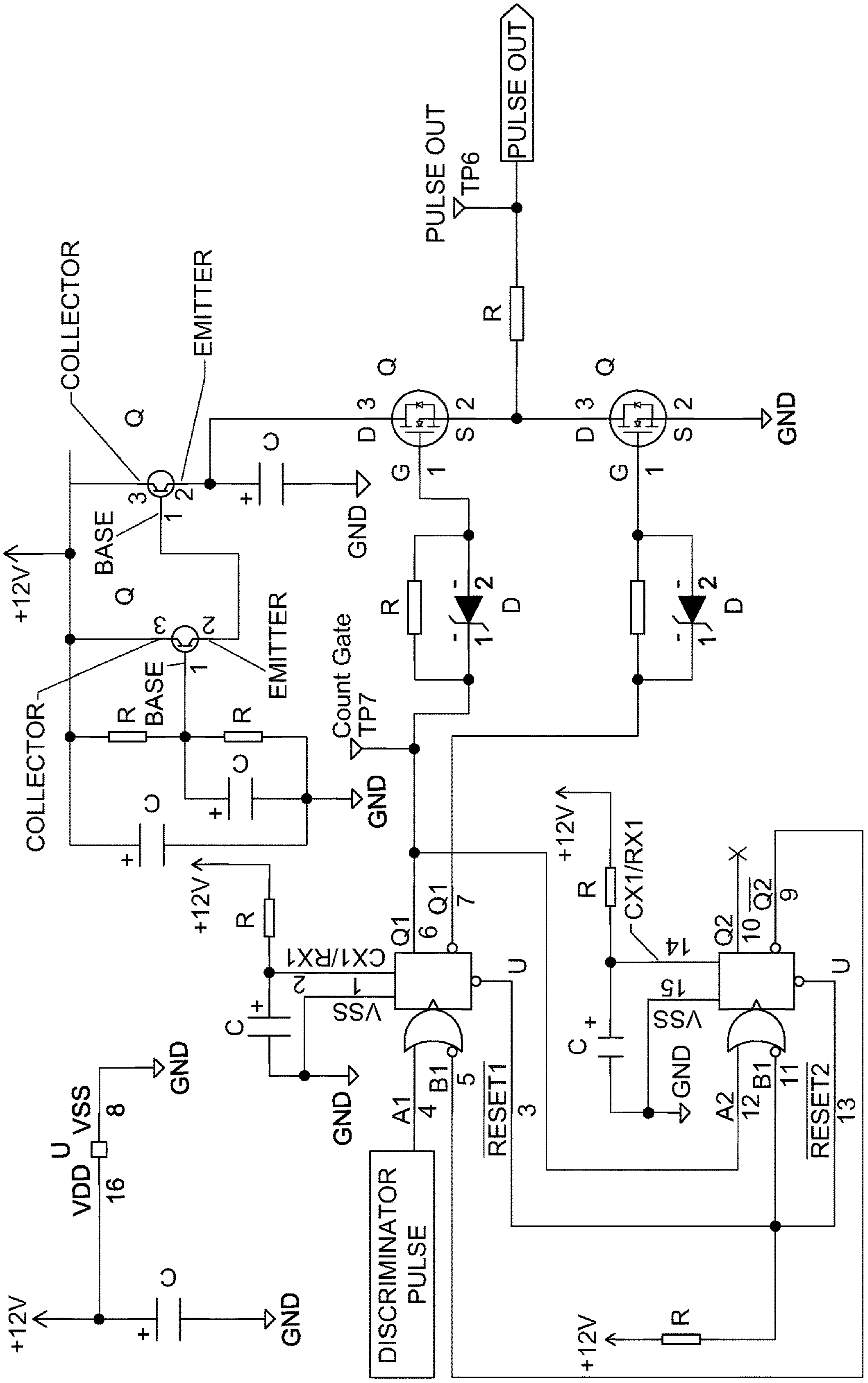
FIG. 7 illustrates a pulse processing circuit for radiation detection applications according to one non-limiting embodiment.

Referring to FIG. 7, a pulse processing circuit for radiation detection applications is illustrated in accordance with one embodiment. The pulse processing circuit may be incorporated within the circuit board assembly 106 or the circuit board assembly 203 to process digital pulses received from the discriminator circuit described with reference to FIG. 4. The pulse processing circuit may generate standardized output pulses suitable for counting by external electronics or microprocessors.

The pulse processing circuit may include a dual monostable multivibrator configuration with associated components for generating standardized output pulses. The dual monostable multivibrator configuration may comprise a cascade arrangement of two monostable multivibrator integrated circuits powered by a regulated voltage supply, such as the regulated voltage provided by the voltage regulation circuit described with reference to FIG. 5.

A first monostable multivibrator integrated circuit within the pulse processing circuit may be triggered by a discriminator pulse received from the discriminator pulse test point TP5 of the discriminator circuit. The first monostable multivibrator integrated circuit may generate a pulse of defined width when triggered by the discriminator pulse. This pulse of defined width may implement a controlled dead time during which subsequent input pulses are ignored to prevent double-counting of single radiation events. The controlled dead time may ensure that multiple pulses generated from a single radiation event are not counted as separate events, which may improve measurement accuracy of the scintillation detector assembly.

With continued reference to FIG. 7, the first monostable multivibrator integrated circuit may receive power from a positive supply voltage through a capacitor connected to ground. Timing components including a capacitor and a resistor may be connected to the first monostable multivibrator integrated circuit to establish the duration of the controlled dead time. The timing components may be selected to provide a dead time duration appropriate for the expected radiation event rate and pulse characteristics of the scintillation detector assembly.

The pulse processing circuit may include an intermediate stage positioned between the first monostable multivibrator integrated circuit and a second monostable multivibrator integrated circuit. The intermediate stage may include level-shifting components with Schottky diodes and parallel resistors that form a pulse steering network. The pulse steering network may ensure proper signal transfer between stages of the dual monostable multivibrator configuration. The Schottky diodes within the intermediate stage may provide fast switching characteristics suitable for pulse processing applications. The parallel resistors within the intermediate stage may establish appropriate voltage levels and impedances for signal transfer between the monostable multivibrator stages.

As further shown in FIG. 7, a count gate test point TP7 may be provided at the intermediate stage of the pulse processing circuit for monitoring purposes. The count gate test point TP7 may allow for observation of signals at the intermediate stage during testing, calibration, or troubleshooting of the pulse processing circuit.

The second monostable multivibrator integrated circuit may receive the output from the first monostable multivibrator integrated circuit through the intermediate stage. The second monostable multivibrator integrated circuit may be powered from the positive supply voltage through a capacitor and resistor arrangement similar to the first monostable multivibrator integrated circuit. The second monostable multivibrator integrated circuit may produce a final standardized output pulse when triggered by the signal from the first stage.

The pulse processing circuit may provide enhanced noise immunity through the dual monostable multivibrator configuration. Random noise that might occasionally trigger the first monostable multivibrator integrated circuit may be unlikely to propagate through both stages with the correct timing relationship. This dual-stage arrangement may reduce false counts that could otherwise result from noise events within the scintillation detector assembly.

With continued reference to FIG. 7, a final output stage of the pulse processing circuit may employ N-channel enhancement-mode MOSFETs to provide appropriate drive capability. The N-channel enhancement-mode MOSFETs may be configured to produce standardized output signals at a pulse out test point TP6. The pulse out test point TP6 may be labeled as a pulse output terminal. The standardized output signals at the pulse out test point TP6 may be suitable for counting by external electronics or microprocessors, ensuring accurate measurement of radiation intensity passing through a material under measurement.

The final output stage may include transistors configured with associated capacitors and resistors to provide signal conditioning for the output pulses. The N-channel enhancement-mode MOSFETs within the final output stage may provide sufficient current drive capability to interface with external counting electronics connected to the scintillation detector assembly through the cable assembly 108 or the cable assembly 217.

Figure 8:
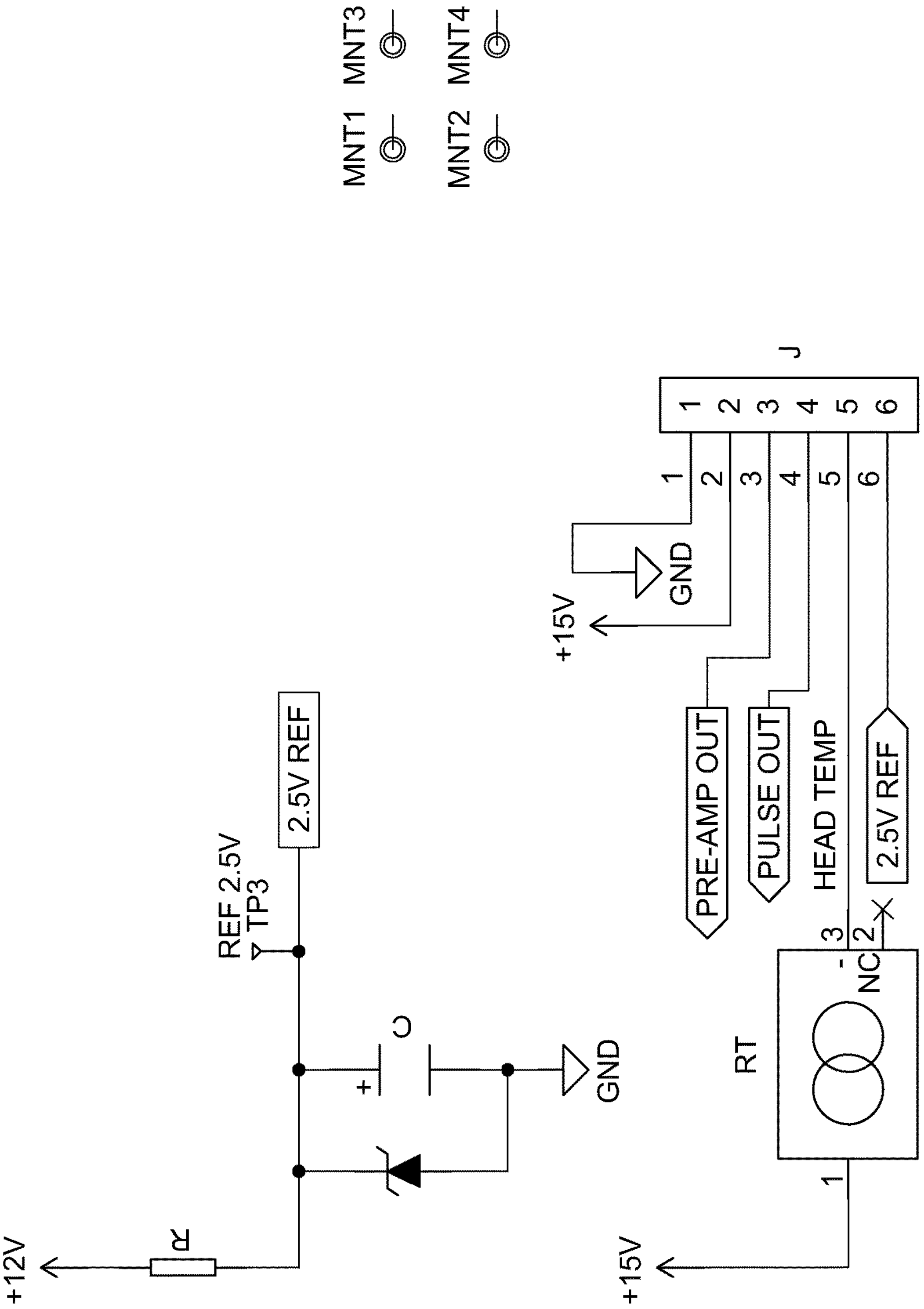
FIG. 8 illustrates an interface circuit for a radiation detector system according to one non-limiting embodiment.

Referring to FIG. 8, an interface circuit for the radiation detector system is illustrated in accordance with one embodiment. The interface circuit may be incorporated within the circuit board assembly 106 or the circuit board assembly 203 to provide voltage reference functionality and connector arrangements for interfacing detector components with external electronics.

The interface circuit may include a voltage reference section positioned within an upper portion of the circuit. A resistor may be connected between a positive supply voltage and a node within the voltage reference section. In some cases, the positive supply voltage may be approximately twelve volts. A zener diode may be connected between the node and ground, with a cathode of the zener diode oriented toward the positive supply voltage. A capacitor may be connected in parallel with the zener diode, with a positive terminal of the capacitor at the node and a negative terminal of the capacitor connected to ground. This arrangement of the resistor, the zener diode, and the capacitor may generate a regulated reference voltage accessible at a test point within the interface circuit. In some cases, the regulated reference voltage may be approximately 2.5 volts. The regulated reference voltage may be used by the preamplifier circuit described with reference to FIG. 3 and the discriminator circuit described with reference to FIG. 4.

With continued reference to FIG. 8, the interface circuit may include a connector interface arrangement positioned within a lower portion of the circuit. The connector interface arrangement may include a connector that provides connections for various detector signals and power. The connector may be a multi-pin interface, such as a six-pin connector, that enables electrical connectivity between the circuit board assembly 106 or the circuit board assembly 203 and external electronics through the cable assembly 108 or the cable assembly 217.

A first pin of the connector may receive a preamplifier output signal from the preamplifier circuit. A second pin of the connector may receive a pulse output signal from the pulse out test point TP6 of the pulse processing circuit described with reference to FIG. 7. A third pin of the connector may be connected to a temperature output from a temperature monitoring function within the interface circuit. A fourth pin of the connector may receive a positive supply voltage with an associated ground connection. A fifth pin of the connector may be connected to ground. A sixth pin of the connector may receive a high voltage bias signal for biasing the PMT 117 or the PMT 220 within the scintillation detector assembly.

As further shown in FIG. 8, a temperature monitoring function may be implemented within the interface circuit using a precision temperature transducer. The precision temperature transducer may be connected between a power supply and a temperature data pin of the connector. In some cases, the power supply may be a positive fifteen volt supply. The precision temperature transducer may generate a current proportional to absolute temperature, providing temperature data that may be used for compensation or calibration purposes within the radiation detector system. The temperature data from the precision temperature transducer may enable external electronics to compensate for temperature-related variations in detector performance or to monitor operating conditions of the scintillation detector assembly.

The interface circuit may include a first mounting hole MNT1, a second mounting hole MNT2, a third mounting hole MNT3, and a fourth mounting hole MNT4 positioned to allow mechanical attachment of the circuit board assembly 106 or the circuit board assembly 203 within the detector housing 101 or the detector housing 201. The first mounting hole MNT1, the second mounting hole MNT2, the third mounting hole MNT3, and the fourth mounting hole MNT4 may be positioned near corners or edges of the circuit board assembly to provide secure mechanical attachment. The mounting holes may receive fasteners that secure the circuit board assembly to mounting hardware within the scintillation detector assembly, such as the mounting components described with reference to the cover assembly 104 and the housing 105.

Figure 9:
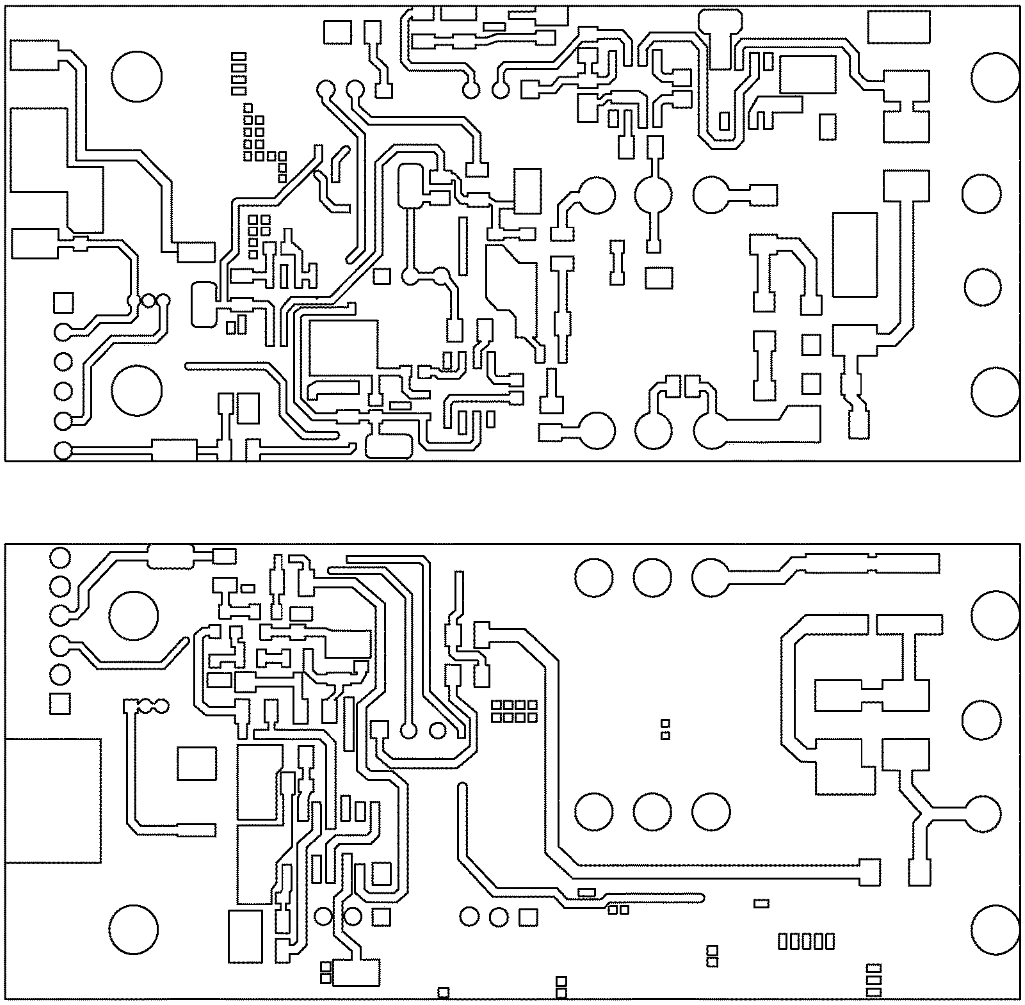
FIG. 9 illustrates top and bottom views of a circuit board layout according to one non-limiting embodiment.

Referring to FIG. 9, top and bottom views of a printed circuit board layout for an analog scintillation detector circuit are illustrated in accordance with one embodiment. The printed circuit board layout may incorporate the circuits described with reference to FIG. 3 through FIG. 8, including the preamplifier circuit, the discriminator circuit, the voltage regulation circuit, the high voltage power supply circuit, the pulse processing circuit, and the interface circuit. The printed circuit board layout may integrate these circuits onto a single board to provide a consolidated design for the scintillation detector assembly.

The printed circuit board layout may feature curved routing patterns, with traces following predominantly arced paths rather than straight lines. The left panel of FIG. 9 depicts one side of the printed circuit board, showing various conductive traces and component pads arranged across the board surface. The traces connecting component pads may follow curved pathways that wind across the board surface rather than following rectilinear routing patterns. The right panel of FIG. 9 depicts an opposite side of the printed circuit board, revealing a denser arrangement of traces and component pads with numerous curved traces interconnecting various component locations.

With continued reference to FIG. 9, the curved trace geometry may offer benefits for signal integrity and noise reduction within the printed circuit board layout. The curved routing patterns may reduce electromagnetic interference by avoiding sharp corners that could act as antennas or create impedance discontinuities along signal paths. The benefits of curved trace geometry may be particularly relevant due to the high voltage levels present on the printed circuit board, as the high voltage power supply circuit described with reference to FIG. 6 generates elevated voltages for photomultiplier tube operation. The curved traces may reduce the likelihood of voltage breakdown or arcing that could occur at sharp corners where electric field concentrations may be higher. The curved routing may also improve signal quality by providing more uniform impedance characteristics along signal paths, which may reduce reflections and signal distortion within the preamplifier circuit and the discriminator circuit.

As further shown in FIG. 9, the printed circuit board layout may use primarily surface mount components, which may allow for a more compact design of the circuit board assembly. Surface mount components may be positioned on the board surface without requiring through-hole mounting, which may reduce the overall footprint of the circuit board assembly. The use of surface mount technology enables the circuit board assembly to fit within the space constraints of the detector housing while incorporating the multiple circuit functions described with reference to FIG. 3 through FIG. 8.

The printed circuit board layout may use point grounds in a starred position to minimize ground loops and improve signal integrity within the circuit board assembly. A starred ground configuration may route ground connections from various circuit sections to a common point rather than allowing ground currents to flow through shared ground paths. This starred ground arrangement may reduce ground loops that could otherwise introduce noise into sensitive signal processing sections of the circuit board assembly. The point ground configuration may be particularly beneficial for maintaining isolation between the high voltage sections of the high voltage power supply circuit and the low voltage signal processing sections of the preamplifier circuit and the discriminator circuit. By minimizing ground loops through the starred ground arrangement, the printed circuit board layout may reduce susceptibility to electromagnetic interference that could compromise measurement accuracy of the scintillation detector assembly.

Figure 10:
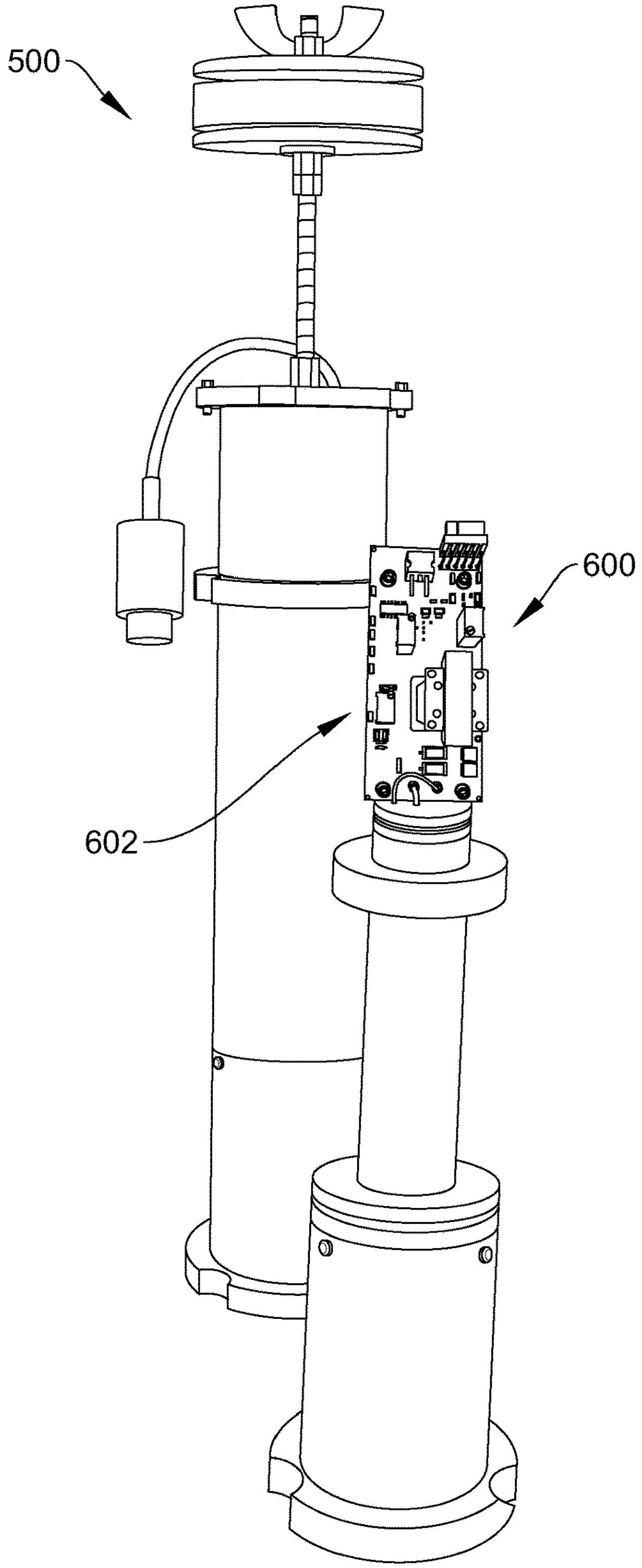
FIG. 10 illustrates a perspective view of multiple detector assemblies according to one non-limiting embodiment.

Referring to FIG. 10, multiple detector assemblies arranged side by side are illustrated in accordance with various embodiments. The figure shows several detector configurations of varying sizes and designs that demonstrate the modular nature of the scintillation detector systems described herein. A detector 500 is shown which may include a top cap with connectors, a cylindrical metallic housing, and associated electronic components. A circuit board assembly 502 (FIG. 11) may be positioned within the detector 500 to provide signal processing functionality for radiation detection applications. A detector 600 is positioned adjacent to the detector 500 in FIG. 10, in a partially disassembled state to show a circuit board assembly 602, which is visible at an upper portion of the detector 600. The detector 600 may include a larger cylindrical metallic body with a base ring.

With continued reference to FIG. 10, the detector 500 and the detector 600 may utilize single circuit board assemblies, such as the circuit board assembly 502 (FIG. 11) and the circuit board assembly 602, which may integrate multiple functions onto single boards. The integration of multiple functions onto the circuit board assembly 502 and the circuit board assembly 602 may simplify a manufacturing process by reducing the number of separate components and interconnections that need to be assembled. The circuit board assembly 502 and the circuit board assembly 602 may incorporate the preamplifier circuit, the discriminator circuit, the voltage regulation circuit, the high voltage power supply circuit, the pulse processing circuit, and the interface circuit described with reference to FIG. 3 through FIG. 8 onto respective single boards.

As further shown in FIG. 10, the consolidated design of the circuit board assembly 502 and the circuit board assembly 602 may improve reliability by reducing the number of interconnections between separate boards. Traditional detector systems that utilize multiple separate circuit boards interconnected with cables and connectors may present potential failure points at each interconnection. By integrating multiple functions onto the circuit board assembly 502 and the circuit board assembly 602, the detector 500 and the detector 600 may reduce the number of cables, connectors, and inter-board connections that could otherwise introduce failure points or susceptibility to electromagnetic interference.

The modular nature of the detector 500 and the detector 600 may allow for easier maintenance and replacement of components in the field compared to traditional systems. In some cases, the circuit board assembly 502 may be removed from the detector 500 and replaced as a single unit, reducing time and complexity associated with servicing the detector 500. Similarly, the circuit board assembly 602 may be removed from the detector 600 and replaced as a single unit. The modular design may improve serviceability of the detector 500 and the detector 600 by enabling field technicians to replace the circuit board assembly 502 or the circuit board assembly 602 without requiring access to multiple separate boards or complex disassembly procedures.

Figure 11:
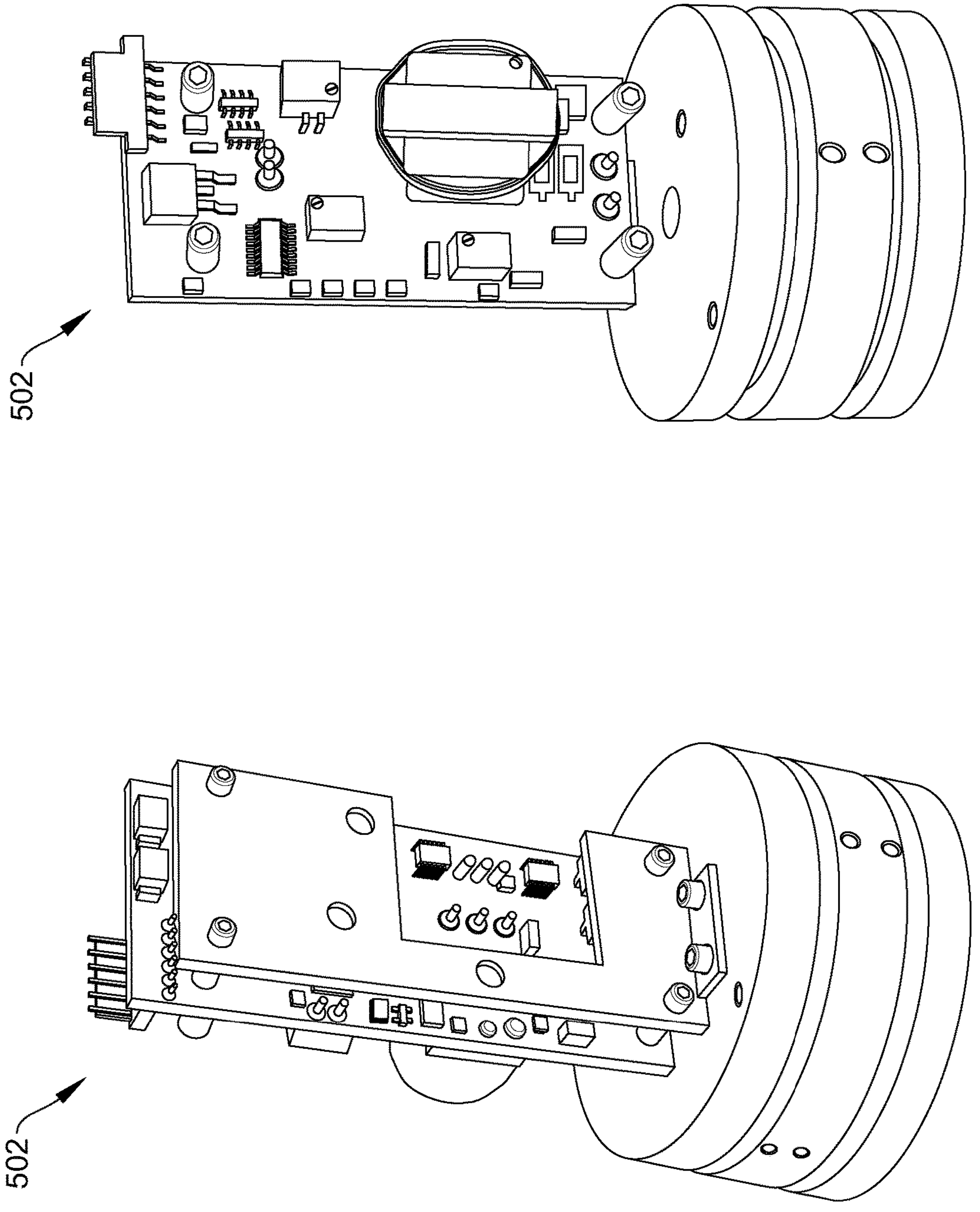
FIG. 11 illustrates perspective views of a circuit board assembly according to one non-limiting embodiment.

Referring to FIG. 11, perspective views of the circuit board assembly 502 are illustrated in accordance with various embodiments. The circuit board assembly 502 incorporates various electronic components mounted on the printed circuit board, including integrated circuits, resistors, capacitors, and other surface-mounted components. The electronic components may be arranged across the surfaces of the printed circuit board to provide the signal processing functionality described with reference to FIG. 3 through FIG. 8. The surface-mounted components may include the operational amplifiers, monostable multivibrator integrated circuits, voltage regulators, and passive components that form the preamplifier circuit, the discriminator circuit, the voltage regulation circuit, the high voltage power supply circuit, the pulse processing circuit, and the interface circuit.

The components on the circuit board assembly 502 are arranged in a layout that allows for proper spacing and electrical isolation between different sections of the circuitry. The layout may position high voltage components at a distance from low voltage signal processing components to maintain electrical isolation and reduce the risk of interference between circuit sections. The spacing between components may also facilitate heat dissipation from power-handling components within the circuit board assembly 502.

With continued reference to FIG. 11, the circuit board assembly 502 may be mounted on a circular metallic base plate. The circular metallic base plate may provide mechanical support for the circuit board assembly 502 and may facilitate mounting of the circuit board assembly 502 within a detector housing. The circular configuration of the metallic base plate may correspond to the cylindrical geometry of detector housings such as the detector housing 101 described with reference to FIG. 1 or the detector housing 201 described with reference to FIG. 2.

The circuit board assembly 502 is oriented in a vertical position relative to the circular metallic base plate. The vertical orientation may position the printed circuit board perpendicular to the circular metallic base plate, which may allow the circuit board assembly 502 to extend along a longitudinal axis of a cylindrical detector housing. This vertical orientation may accommodate the coaxial arrangement of components within the scintillation detector assembly while providing access to electronic components for assembly, testing, or maintenance procedures. As further shown in FIG. 11, a metallic bracket is attached to the circuit board assembly 502. The metallic bracket may provide structural support for the printed circuit board within the circuit board assembly 502. The metallic bracket may also provide electromagnetic shielding for electronic components mounted on the printed circuit board. The electromagnetic shielding provided by the metallic bracket may reduce susceptibility of sensitive signal processing circuits to external electromagnetic interference. The shielding may be positioned to protect low voltage signal processing components from electromagnetic emissions generated by high voltage sections of the circuit board assembly 502, such as components associated with the high voltage power supply circuit.

The circuit board assembly 502 includes mounting holes for securing the printed circuit board within a detector housing. The mounting holes may correspond to the first mounting hole MNT1, the second mounting hole MNT2, the third mounting hole MNT3, and the fourth mounting hole MNT4 described with reference to FIG. 8. The mounting holes may receive fasteners that secure the circuit board assembly 502 to mounting hardware within the scintillation detector assembly.

With continued reference to FIG. 11, adjustment components are visible on the circuit board assembly 502. The adjustment components may be potentiometers or trimmer capacitors that allow for calibration of circuit parameters within the circuit board assembly 502. The adjustment components may enable calibration of the discrimination threshold within the discriminator circuit or adjustment of other circuit parameters during manufacturing or field service procedures. The components on the circuit board assembly 502 are arranged to provide functions including high voltage power supply, amplification, and signal processing for radiation detection applications within the scintillation detector assembly.

Figure 12:
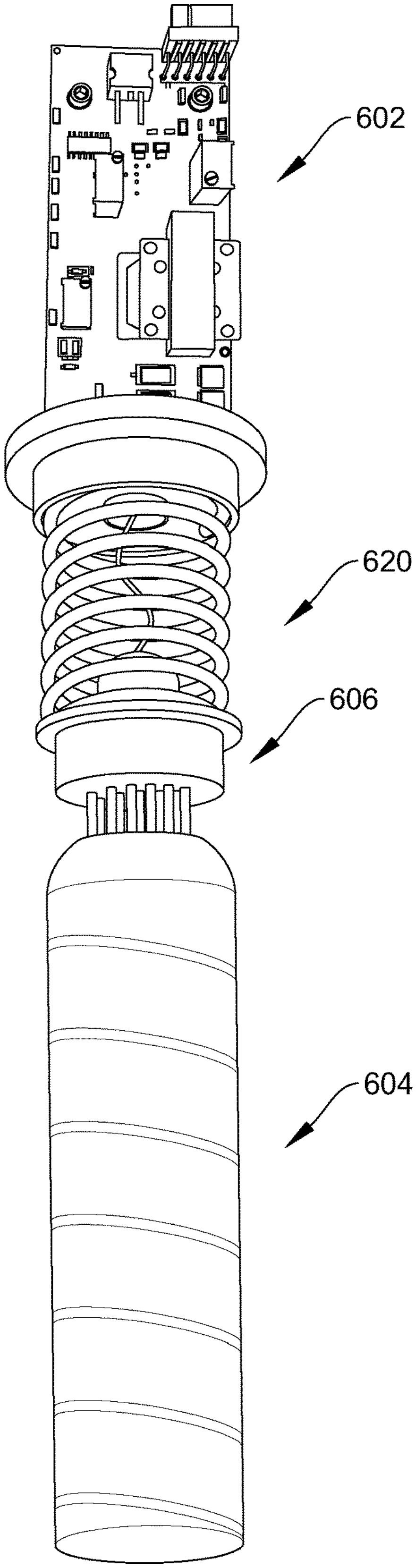
FIG. 12 illustrates a side view of a circuit board assembly with associated components according to one non-limiting embodiment.

Referring to FIG. 12, a side view of the circuit board assembly 602 with associated photomultiplier tube components is illustrated in accordance with one embodiment. The circuit board assembly 602 is shown with components arranged in a vertical configuration that demonstrates the modular assembly approach of the scintillation detector system. The circuit board assembly 602 includes a printed circuit board with various electronic components mounted on a surface of the printed circuit board. The electronic components may include connectors and circuitry elements that provide signal processing functionality similar to the circuit board assembly 502 described with reference to FIG. 11. The circuit board assembly 602 may incorporate the preamplifier circuit, the discriminator circuit, the voltage regulation circuit, the high voltage power supply circuit, the pulse processing circuit, and the interface circuit described with reference to FIG. 3 through FIG. 8 onto a single board.

With continued reference to FIG. 12, a compression spring 620 is positioned below the circuit board assembly 602. The compression spring 620 may provide mechanical support for components within the detector assembly. The compression spring 620 may also maintain electrical contact between components when the detector assembly is in an assembled configuration. The compression spring 620 may exert a compressive force that ensures stable positioning of components along a longitudinal axis of the detector assembly. The compressive force provided by the compression spring 620 may accommodate manufacturing tolerances and thermal expansion of components while maintaining reliable electrical connectivity.

A socket 606 is coupled to the circuit board assembly 602 and is positioned to receive a PMT 604. The socket 606 may establish electrical connection between the circuit board assembly 602 and the PMT 604. The socket 606 may receive electrical signals generated by the PMT 604 when scintillation events occur within a crystal of the detector assembly. The socket 606 may transmit the electrical signals from the PMT 604 to the preamplifier circuit within the circuit board assembly 602 for amplification and processing.

As further shown in FIG. 12, the PMT 604 is shown as a cylindrical component with a ribbed or grooved exterior surface extending from the socket 606. The PMT 604 may convert scintillation light received through an optical coupling into electrical signals proportional to the intensity of the scintillation light. The PMT 604 may receive operating voltage from the high voltage power supply circuit within the circuit board assembly 602 through the socket 606.

The compression spring 620 connects to the socket 606 and provides appropriate compression force between the circuit board assembly 602 and the PMT 604. The compression spring 620 may be positioned to maintain contact between the socket 606 and the PMT 604 during operation of the detector assembly. The compressive force from the compression spring 620 may ensure that electrical connections between the PMT 604 and the socket 606 remain stable despite vibration or mechanical disturbances that may occur in industrial measurement environments.

The arrangement of the circuit board assembly 602, the compression spring 620, the socket 606, and the PMT 604 demonstrates a coaxial alignment of components within the detector assembly. The coaxial alignment may facilitate efficient transmission of scintillation light to the PMT 604 and may maintain proper electrical connectivity between the PMT 604 and the circuit board assembly 602.

The modular nature of the design shown in FIG. 12 may allow the circuit board assembly 602, the socket 606, and the PMT 604 to be separately serviced or replaced as needed. In some cases, the PMT 604 may be removed from the socket 606 and replaced without requiring replacement of the circuit board assembly 602. Similarly, the circuit board assembly 602 may be replaced without requiring replacement of the PMT 604 if the PMT 604 remains functional. This modular approach may reduce maintenance costs and downtime by enabling replacement of individual components rather than requiring replacement of entire assemblies. The modular design may also facilitate troubleshooting by allowing technicians to isolate and test individual components within the detector assembly.

Figure 13:
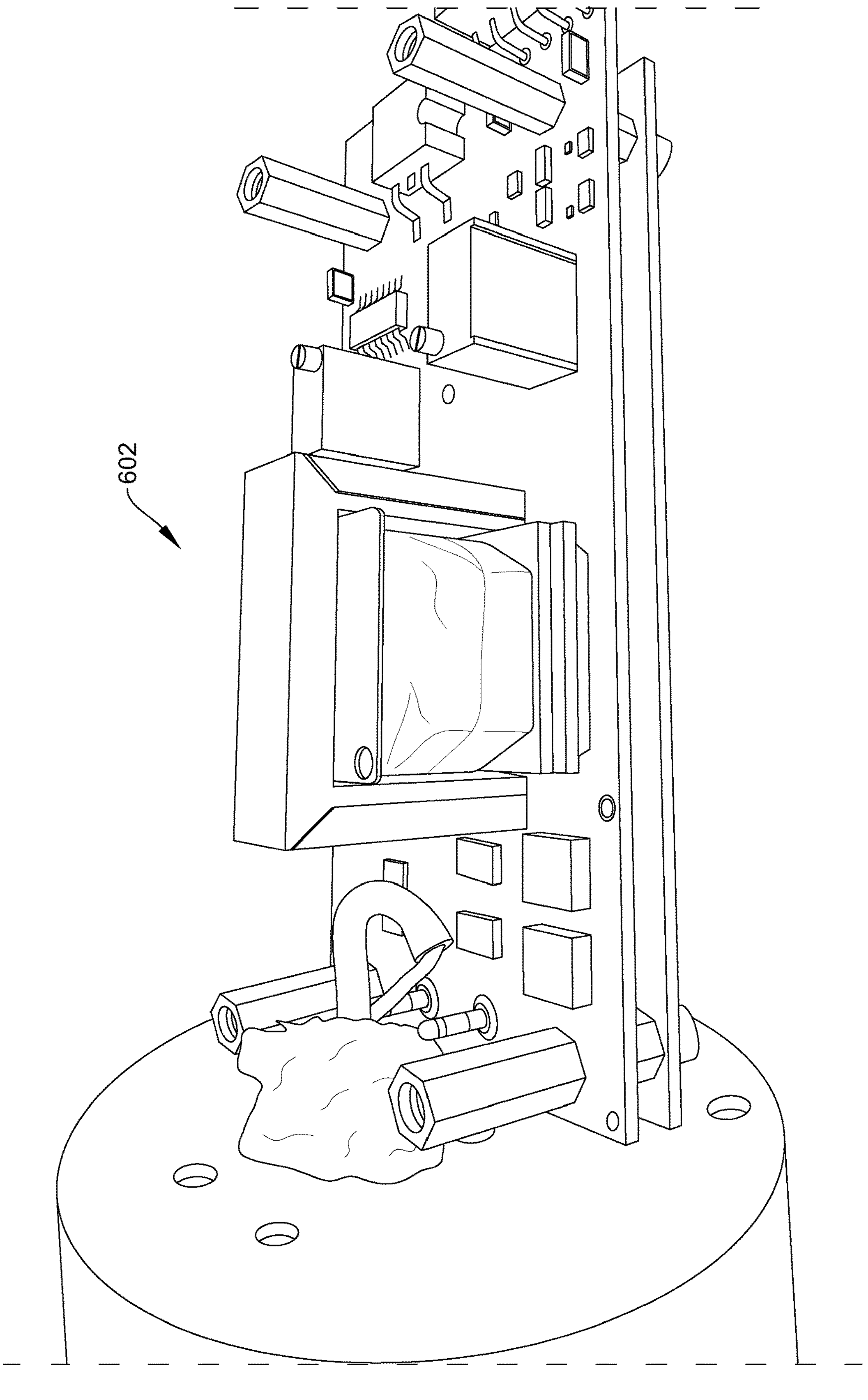
FIG. 13 illustrates a perspective view of a circuit board assembly according to one non-limiting embodiment.

Referring to FIG. 13, a perspective view of the circuit board assembly 602 is illustrated in accordance with one embodiment. The circuit board assembly 602 comprises a printed circuit board with various electronic components mounted on a surface of the printed circuit board. The circuit board assembly 602 includes several components that may be potentiometers or trimmer components positioned at different locations on the printed circuit board for adjustment of circuit parameters during manufacturing or field service procedures.

A transformer component with metallic shielding is visible on an upper portion of the circuit board assembly 602. The transformer component may be associated with the high voltage power supply circuit that provides operating voltage for a photomultiplier tube within the scintillation detector assembly. The metallic shielding surrounding the transformer component may minimize electromagnetic interference by containing electromagnetic emissions generated during operation of the transformer and may prevent coupling of high-frequency noise from the transformer into adjacent signal processing circuits on the circuit board assembly 602.

With continued reference to FIG. 13, the circuit board assembly 602 utilizes surface mount technology for most components mounted on the printed circuit board. In some cases, through-hole components may also be present on the circuit board assembly 602 where larger component sizes or higher power handling capabilities may be beneficial.

The circuit board assembly 602 includes a connector interface positioned at a bottom edge of the printed circuit board. The connector interface may provide electrical connectivity between the circuit board assembly 602 and external electronics through a cable assembly. The connector interface may include multiple pins that carry various signals including preamplifier output signals, pulse output signals, temperature data, power supply voltages, and high voltage bias signals for photomultiplier tube operation.

As further shown in FIG. 13, the circuit board assembly 602 is designed with curved trace routing patterns on the printed circuit board surface. The mounting holes may receive fasteners that secure the circuit board assembly 602 to mounting hardware within a detector housing. The mounting holes may be positioned to provide secure mechanical attachment while maintaining clearance from electronic components and conductive traces on the printed circuit board.

Figure 14:
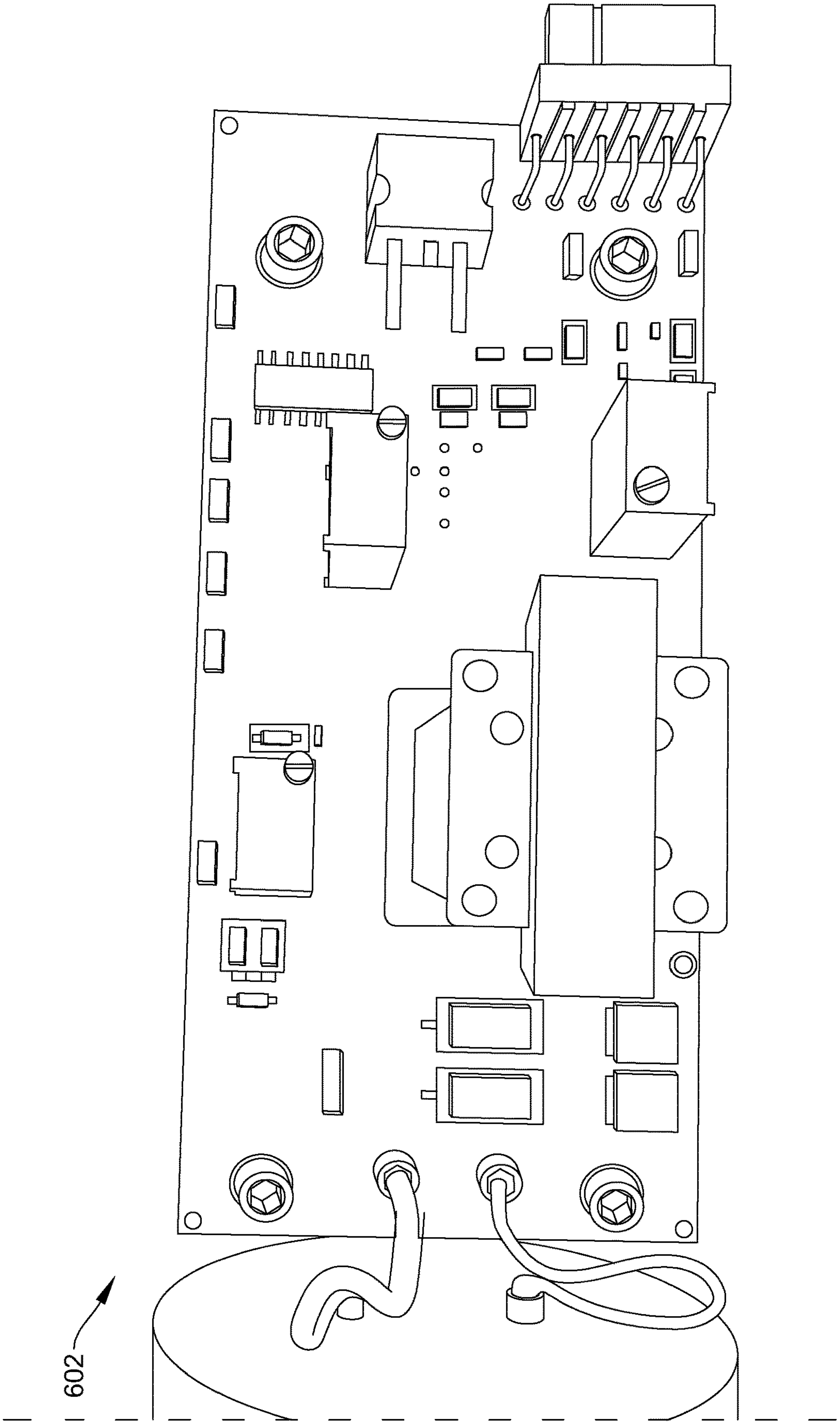
FIG. 14 illustrates a close-up view of a circuit board assembly according to one non-limiting embodiment.

Referring to FIG. 14, a close-up view of the circuit board assembly 602 is illustrated in accordance with another embodiment. The circuit board assembly 602 includes several trimmer potentiometer components positioned at different locations on the printed circuit board for adjustment purposes. The transformer component with metallic shielding is visible on the circuit board assembly 602. The circuit board assembly 602 incorporates both high voltage and low voltage circuitry on the same printed circuit board while maintaining electrical isolation between the high voltage sections and the sensitive low voltage signal processing sections. The high voltage sections may include components associated with the high voltage power supply circuit that generates operating voltage for photomultiplier tube operation. The low voltage signal processing sections may include components associated with the preamplifier circuit, the discriminator circuit, and the pulse processing circuit. The electrical isolation between the high voltage sections and the low voltage signal processing sections may be maintained through component placement, trace routing, and spacing on the printed circuit board. The electrical isolation may reduce the risk of interference between high voltage circuitry and sensitive signal processing circuitry within the circuit board assembly 602.

Multiple test points are visible on the circuit board assembly 602 for diagnostic and calibration purposes. The test points may provide access to signals at various stages within the circuit board assembly 602, enabling measurement and verification of circuit operation during testing, calibration, or troubleshooting procedures.

As further shown in FIG. 14, the circuit board assembly 602 features curved trace routing patterns on the printed circuit board surface for electrical connections between components. Several capacitors and resistors are distributed across the circuit board assembly 602 to support the various circuit functions including voltage regulation, signal coupling, filtering, and timing functions within the preamplifier circuit, the discriminator circuit, the voltage regulation circuit, the high voltage power supply circuit, the pulse processing circuit, and the interface circuit. The overall construction of the circuit board assembly 602 demonstrates an integrated design where multiple electronic functions are consolidated onto a single printed circuit board for use in radiation detection applications within the scintillation detector assembly.

Figure 15:
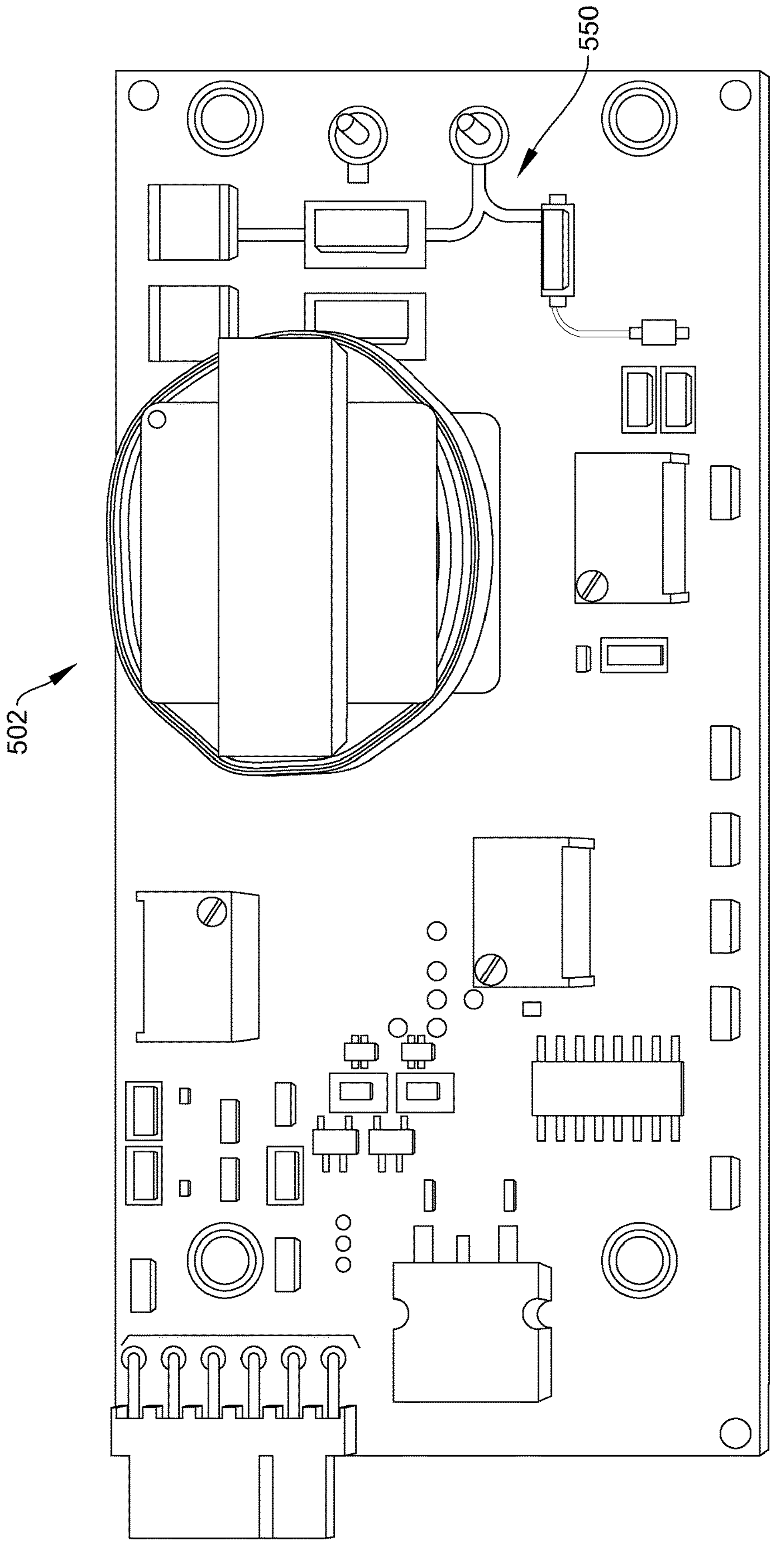
FIG. 15 illustrates a perspective view of a circuit board assembly with curved traces according to one non-limiting embodiment.

Referring to FIG. 15, a perspective view of the circuit board assembly 502 is illustrated in accordance with one embodiment. The circuit board assembly 502 comprises a printed circuit board with various surface-mounted electronic components arranged across a surface of the printed circuit board. The circuit board assembly 502 includes multiple integrated circuits, resistors, capacitors, and other electronic components mounted on the printed circuit board to provide signal processing functionality for radiation detection applications.

The components on the circuit board assembly 502 are interconnected by traces 550. The traces 550 feature curved routing paths rather than straight lines. The circuit board assembly 502 has mounting holes positioned near corners of the printed circuit board for securing the circuit board assembly 502 in place within a detector housing. The mounting holes may receive fasteners that attach the circuit board assembly 502 to mounting hardware within the scintillation detector assembly.

A transformer component with insulation is visible on an upper portion of the circuit board assembly 502. The transformer component may be associated with the high voltage power supply circuit that provides operating voltage for a photomultiplier tube within the scintillation detector assembly. The transformer component may include shielding to minimize electromagnetic interference by containing electromagnetic emissions generated during operation of the transformer. The shielding of the transformer component may prevent coupling of high-frequency noise into adjacent signal processing circuits on the circuit board assembly 502.

As further shown in FIG. 15, potentiometer components are distributed across the surface of the circuit board assembly 502 for adjustment of circuit parameters during manufacturing or field service procedures.

A connector interface with multiple pins is positioned at an edge of the circuit board assembly 502 for electrical connectivity. The connector interface may provide connections between the circuit board assembly 502 and external electronics through a cable assembly. The connector interface may include pins that carry various signals including preamplifier output signals, pulse output signals, temperature data, power supply voltages, and high voltage bias signals for photomultiplier tube operation.

The circuit board assembly 502 utilizes primarily surface mount technology for most components mounted on the printed circuit board. The circuit board assembly 502 is designed to integrate high voltage supply, amplification, and signal processing functions onto the single printed circuit board. The integration of these multiple functions may reduce the number of interconnections that would otherwise be present in a multi-board configuration, which may improve reliability and reduce susceptibility to electromagnetic interference within the scintillation detector assembly.

Figure 16:
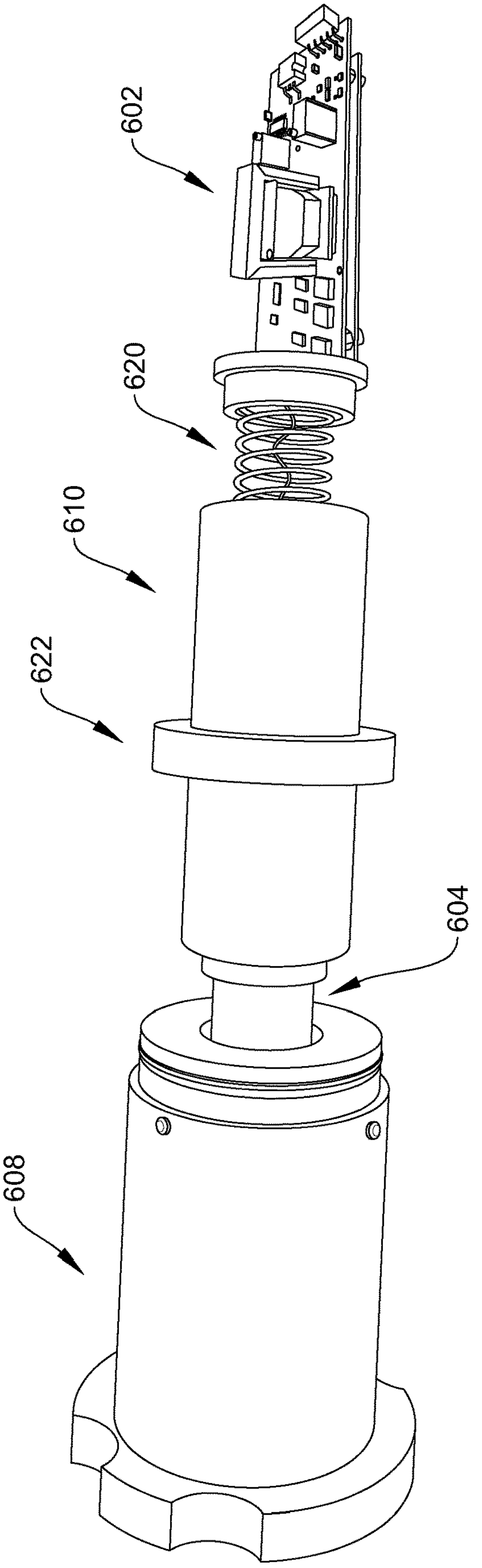
FIG. 16 illustrates a view of a detector assembly with internal components according to one non-limiting embodiment.

Referring to FIG. 16, a detector assembly in accordance with one embodiment is illustrated. The detector assembly includes the circuit board assembly 602 positioned at one end of the detector assembly. The circuit board assembly 602 contains electronic components for processing signals from a radiation detector system, including the preamplifier circuit, the discriminator circuit, the voltage regulation circuit, the high voltage power supply circuit, the pulse processing circuit, and the interface circuit described with reference to FIG. 3 through FIG. 8.

A PMT 504 is positioned adjacent to the circuit board assembly 502 within the detector assembly. The PMT 504 may connect to the circuit board assembly 502 through a socket that establishes electrical communication between the PMT 504 and the signal processing circuitry on the circuit board assembly 502. The PMT 504 may convert scintillation light received from a crystal into electrical signals proportional to the intensity of the scintillation light. The PMT 504 may receive operating voltage from the high voltage power supply circuit within the circuit board assembly 502.

With continued reference to FIG. 16, an annular housing 608 is shown at an opposite end of the detector assembly from the circuit board assembly 602. The annular housing 608 may be designed to contain and protect internal components of the detector assembly. The annular housing 608 may provide a structural enclosure that supports the coaxial arrangement of components within the detector assembly. The annular housing 608 may be configured to receive and position a crystal and associated optical coupling components that transmit scintillation light to the PMT 604.

A PMT shield 610 extends from the annular housing 608 toward the circuit board assembly 602. The PMT shield 610 may provide electromagnetic shielding for the PMT 604. The PMT shield 610 may surround the PMT 604 in a coaxial configuration, with the PMT shield 610 positioned around an outer circumference of the PMT 604. The electromagnetic shielding provided by the PMT shield 610 may protect the PMT 604 from external electromagnetic fields that could interfere with photomultiplier tube operation. The PMT shield 610 may attenuate electromagnetic interference that could otherwise couple into the PMT 604 and introduce noise into electrical signals generated by the PMT 604 in response to scintillation events.

As further shown in FIG. 16, a spring 620 is positioned between components in the detector assembly. The spring 620 may provide mechanical support for the PMT 604 and adjacent components within the detector assembly. The spring 620 may maintain proper contact between the PMT 604 and adjacent components by exerting a compressive force along a longitudinal axis of the detector assembly. The compressive force provided by the spring 620 may ensure stable positioning of the PMT 604 relative to the circuit board assembly 602 and the annular housing 608. The spring 620 may also maintain electrical connectivity between the PMT 604 and a socket that connects the PMT 604 to the circuit board assembly 602. The compressive force from the spring 620 may accommodate manufacturing tolerances and thermal expansion of components while maintaining reliable mechanical and electrical connections within the detector assembly.

A support ring 622 is positioned within the detector assembly to provide structural support. The support ring 622 may be positioned to maintain alignment of components along the central axis of the detector assembly. The support ring 622 may provide a bearing surface or positioning feature that guides the PMT 604 or the PMT shield 610 into proper alignment during assembly of the detector assembly. The support ring 622 may also provide mechanical support that resists lateral displacement of components within the detector assembly during operation in industrial measurement environments where vibration or mechanical disturbances may occur.

The components of the detector assembly shown in FIG. 16 may be arranged in a coaxial configuration. The circuit board assembly 602, the PMT 604, the PMT shield 610, and the annular housing 608 may be substantially aligned along a central axis of the detector assembly. The coaxial configuration may allow for efficient transmission of scintillation light from a crystal positioned within the annular housing 608 to the PMT 604. The PMT shield 610 may surround and protect the PMT 604 within the coaxial arrangement, providing electromagnetic shielding while maintaining the aligned configuration of components. The spring 620 and the support ring 622 may work together to maintain the coaxial alignment of components and to provide stable mechanical support for the PMT 604 within the detector assembly.

Figure 17:
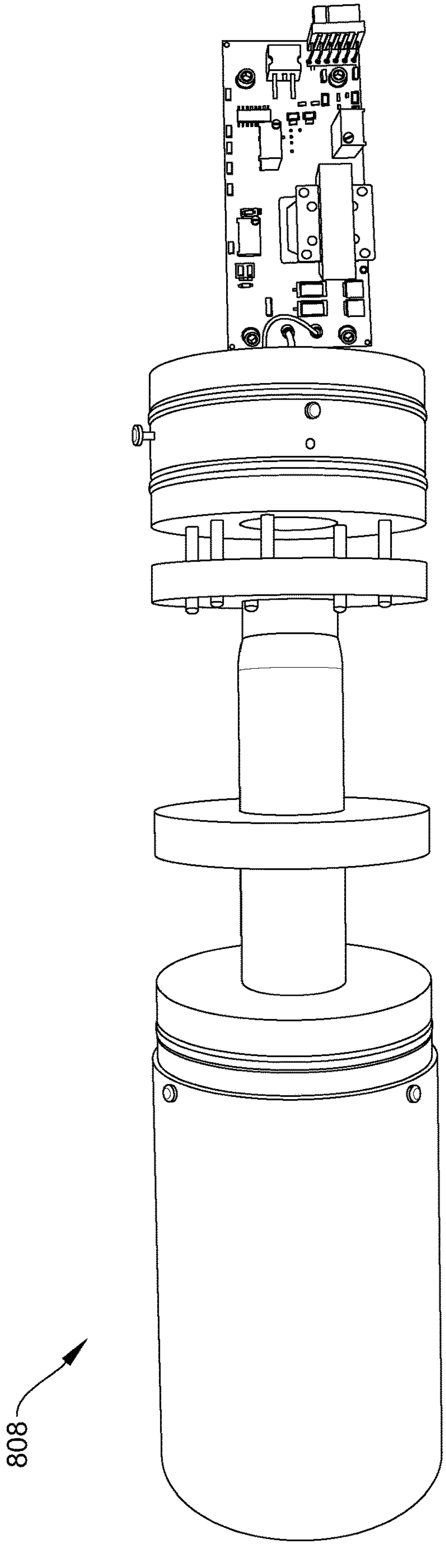
FIG. 17 illustrates an exploded view of two detector assemblies according to one non-limiting embodiment.
Figure 18:
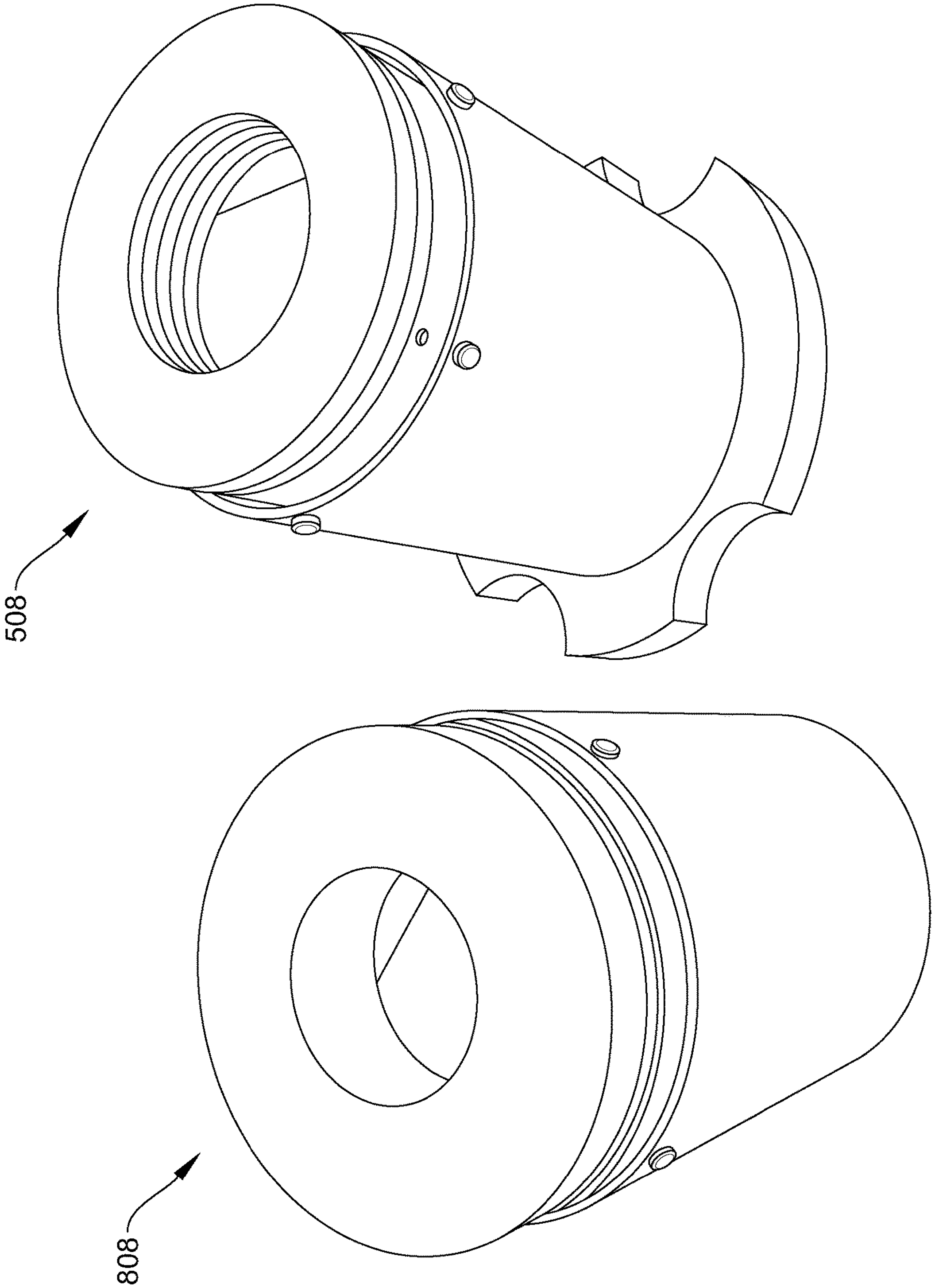
FIG. 18 illustrates a perspective view of two annular housings according to one non-limiting embodiment.

Referring to FIG. 17, an exploded view of a detector assembly is illustrated that shows internal components and construction in accordance with various embodiments. The detector assembly includes the circuit board assembly connected to the annular housing 808. Referring to FIG. 18, perspective views of the annular housing 508 and the annular housing 808 are illustrated in accordance with various embodiments. The annular housing 508 includes an opening at a top surface that is internally threaded. The internal threading provides a threaded interface for connection to adjacent components or housings within a detector assembly. The internally threaded opening may receive a threaded component that engages with the internal threads to secure the component within or adjacent to the annular housing 508. The threaded connection provides a secure mechanical attachment that resists loosening due to vibration or mechanical disturbances encountered in industrial measurement environments.

As further shown in FIG. 18, the annular housing 808 includes an opening at a top surface that is a smooth bore. The smooth bore opening provides an unthreaded cylindrical passage through the top surface of the annular housing 808. The smooth bore configuration accommodates alternative mounting or sealing arrangements compared to the internally threaded opening of the annular housing 508. In some cases, the smooth bore opening may receive components that are secured through press-fit arrangements, adhesive bonding, or external clamping mechanisms rather than threaded engagement.

Figure 19:
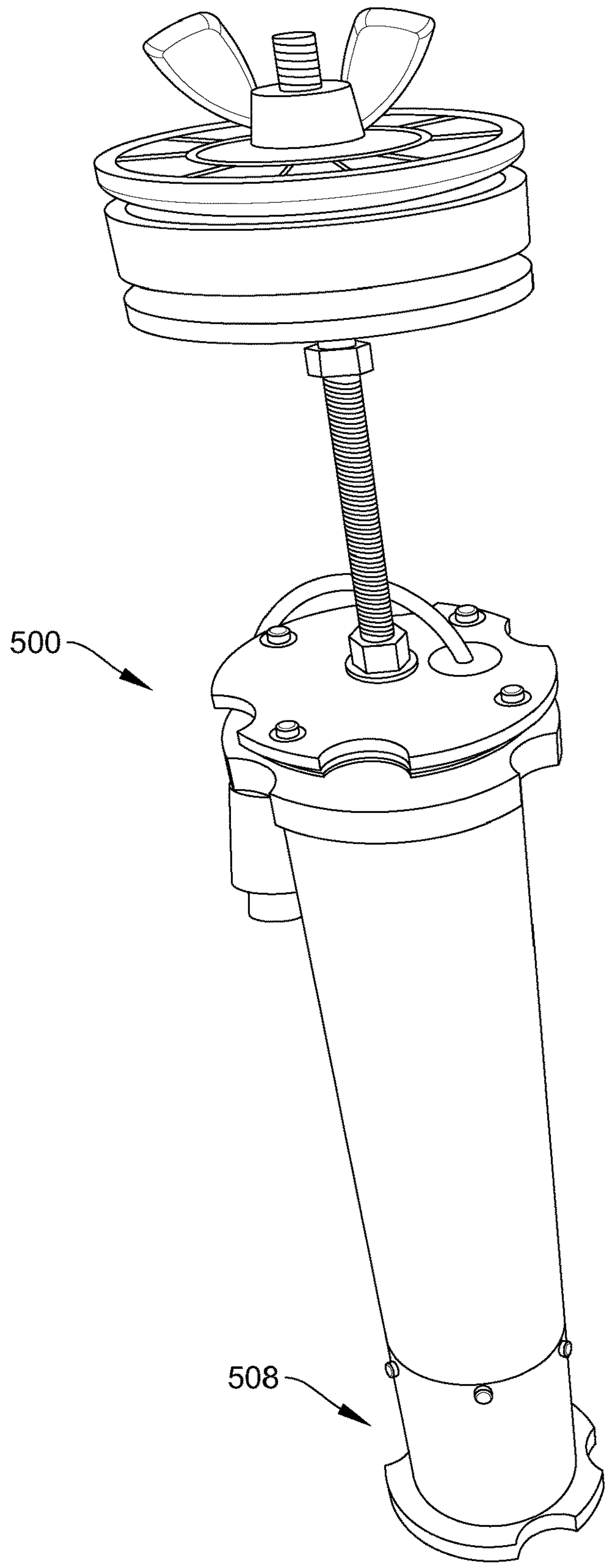
FIG. 19 illustrates a perspective view of a detector assembly according to one non-limiting embodiment.

Referring to FIG. 19, a perspective view of the detector 500 in an assembled configuration is illustrated in accordance with various embodiments. The detector 500 includes a cylindrical metallic housing that extends vertically, with a stainless steel or similar metallic finish visible on a main body portion of the cylindrical metallic housing. The cylindrical metallic housing may contain and protect internal components of the detector 500, including a crystal, optical coupling components, a photomultiplier tube, and a circuit board assembly. The cylindrical metallic housing may provide structural support for the internal components and may protect the internal components from environmental conditions encountered in industrial measurement applications.

With continued reference to FIG. 19, a threaded rod extends upward from the mounting plate of the circuit board assembly mounting arrangement. The threaded rod supports a disc-shaped component with a sealing element positioned between upper and lower portions of the disc-shaped component. The disc-shaped component may provide sealing or clamping functionality within the detector 500. A wing nut is positioned at a top of the threaded rod assembly, providing a means for securing or adjusting the upper components of the detector 500. The wing nut may be rotated by hand to apply compressive force to the disc-shaped component and associated sealing elements, which may facilitate assembly, disassembly, or adjustment of the detector 500 without requiring specialized tools.

A lower portion of the detector 500 features a support ring or base element that provides structural support for the cylindrical metallic housing. The support ring may position the cylindrical metallic housing relative to mounting surfaces or adjacent components within a measurement system. The support ring may also provide a bearing surface that supports the weight of the detector 500 when the detector 500 is installed in a vertical orientation.

As further shown in FIG. 19, the overall construction of the detector 500 demonstrates a modular design where various components may be assembled together to form a complete detection unit suitable for industrial measurement applications. The modular design may allow individual components within the detector 500 to be accessed, serviced, or replaced without requiring complete disassembly of the detector 500. The wing nut and threaded rod arrangement at the upper end of the detector 500 may facilitate access to internal components by enabling removal of upper components through manual adjustment of the wing nut.

The assembled configuration of the detector 500 may be suitable for measuring process or material characteristics such as levels, locations, or densities of fluids, solids, emulsions, or other materials located within reservoirs, tanks, or pipes. The cylindrical metallic housing may provide protection for sensitive internal components while allowing radiation that has passed through a material under measurement to reach a crystal within the detector 500. The modular design of the detector 500 may enable field technicians to perform maintenance or component replacement procedures at installation sites, which may reduce downtime associated with servicing the detector 500 in industrial measurement environments.

Figure 20:
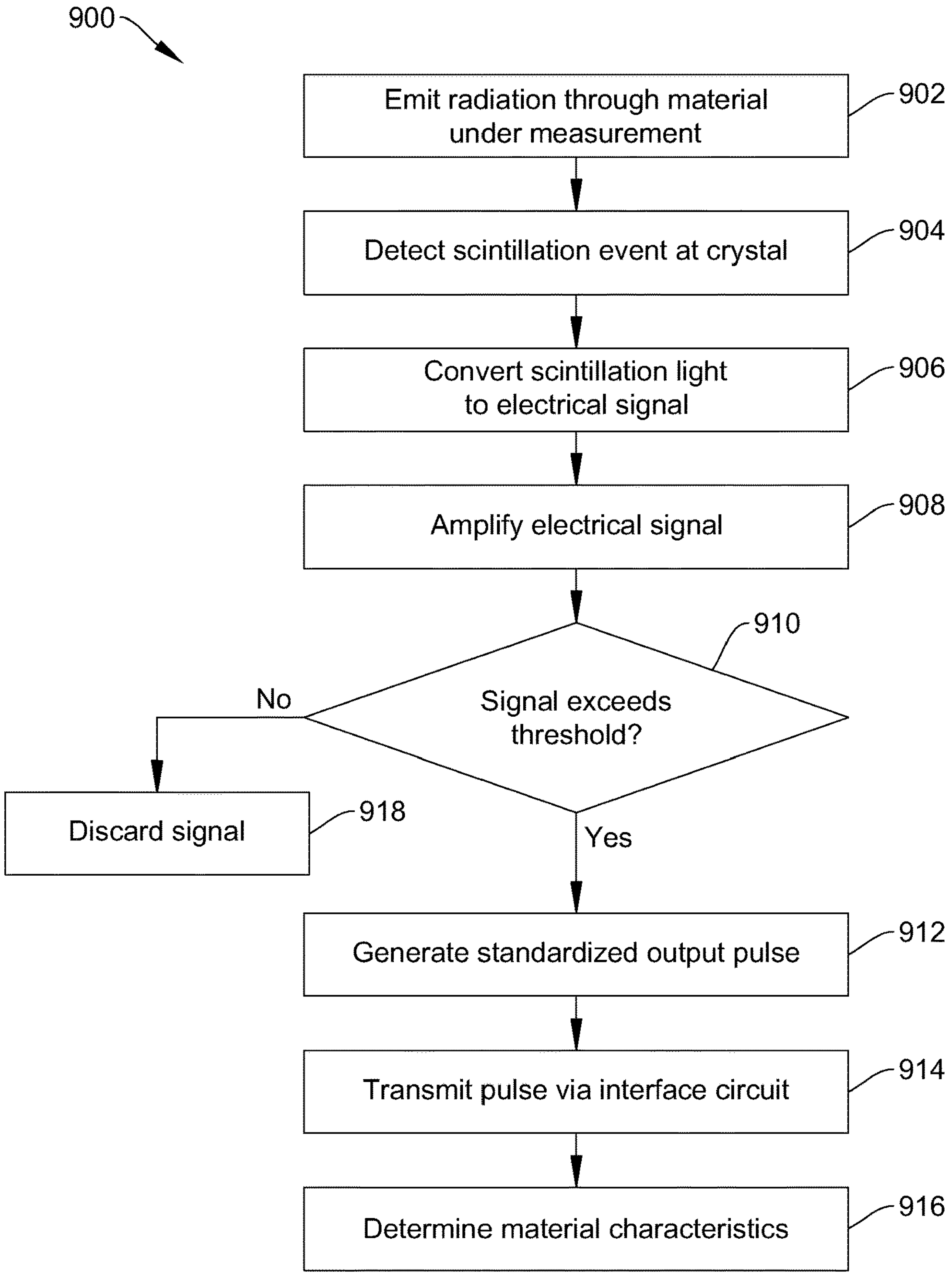
FIG. 20 illustrates a flowchart of a method for detecting radiation through a material under measurement according to one non-limiting embodiment.

Referring to FIG. 20, a method 900 for detecting radiation through a material under measurement is illustrated in accordance with one embodiment. The method 900 may be performed using a scintillation detector assembly such as the detector 500 or the detector 600 described with reference to preceding figures. The method 900 includes a step 902 of emitting radiation from a radiation source through the material under measurement. The radiation source may emit X-rays or gamma energy, such as gamma energy emitted by Cesium-137. The emitted radiation may pass through the material under measurement before reaching a detector assembly positioned on an opposite side of the material from the radiation source. The intensity of radiation reaching the detector assembly may be affected by the characteristics of the material through which the radiation passes, such as the density, level, or composition of the material.

With continued reference to FIG. 20, the method 900 proceeds to a step 904 of detecting a scintillation event at a crystal positioned within the detector assembly. The crystal, such as the crystal 109 or the crystal 206 described with reference to FIG. 1 and FIG. 2, may produce light flashes when struck by radiation that has passed through the material under measurement. The scintillation event may occur when gamma radiation or X-rays interact with the crystal material, causing the crystal to emit photons of visible light. The intensity of the scintillation light produced at the step 904 may be proportional to the energy of the incident radiation.

The method 900 continues to a step 906 of converting the scintillation light to an electrical signal via a photomultiplier tube. The photomultiplier tube, such as the PMT 117, the PMT 220, the PMT 504, or the PMT 604 described with reference to preceding figures, may receive the scintillation light through an optical coupling positioned between the crystal and the photomultiplier tube. The photomultiplier tube may convert the scintillation light into an electrical signal having an amplitude proportional to the intensity of the scintillation light received at the step 906. The photomultiplier tube may amplify the electrical signal through a cascade of dynodes within the photomultiplier tube structure.

As further shown in FIG. 20, the method 900 proceeds to a step 908 of amplifying the electrical signal at a preamplifier. The preamplifier may be incorporated within the circuit board assembly 106, the circuit board assembly 203, the circuit board assembly 502, or the circuit board assembly 602 described with reference to preceding figures. The preamplifier circuit described with reference to FIG. 3 may receive the electrical signal from the photomultiplier tube and may amplify the electrical signal to a level suitable for subsequent processing. The preamplifier may condition the electrical signal by removing direct current components and by providing impedance matching for downstream circuitry.

The method 900 continues to a step 910 of comparing the amplified signal against a discrimination threshold. The discriminator circuit described with reference to FIG. 4 may receive the amplified signal from the preamplifier and may compare the amplified signal against an adjustable reference threshold. The discrimination threshold may be set at the VDIV test point TP4 within the discriminator circuit. The comparison at the step 910 may determine whether the amplified signal represents a valid radiation event or whether the amplified signal represents noise or other spurious signals that should be rejected.

With continued reference to FIG. 20, if the amplified signal does not exceed the discrimination threshold at the step 910, the method 900 proceeds to a step 918 of discarding the signal. Signals that do not exceed the discrimination threshold may be rejected as noise or as signals resulting from low-energy events that are not of interest for the measurement application. The step 918 may prevent false counts that could otherwise result from electrical noise, thermal noise within the photomultiplier tube, or other spurious signals that do not represent valid radiation events passing through the material under measurement.

If the amplified signal exceeds the discrimination threshold at the step 910, the method 900 proceeds to a step 912 of generating a standardized output pulse. The pulse processing circuit described with reference to FIG. 7 may generate the standardized output pulse at the step 912. The standardized output pulse may have a defined amplitude and duration suitable for counting by external electronics or microprocessors. The step 912 may implement dead time control to prevent double-counting of single radiation events. The dead time control may be provided by the first monostable multivibrator integrated circuit within the pulse processing circuit, which may generate a pulse of defined width during which subsequent input pulses are ignored. The dead time control may ensure that multiple pulses generated from a single radiation event are not counted as separate events, which may improve measurement accuracy.

As further shown in FIG. 20, the method 900 continues to a step 914 of transmitting the standardized output pulse via an interface circuit to external electronics. The interface circuit described with reference to FIG. 8 may transmit the standardized output pulse through a connector to external counting electronics or microprocessors. The standardized output pulse may be transmitted through the cable assembly 108 or the cable assembly 217 to external electronics positioned remotely from the detector assembly. The pulse out test point TP6 within the pulse processing circuit may provide the standardized output pulse to the interface circuit for transmission at the step 914.

The method 900 concludes with a step 916 of determining material characteristics based on the processed pulse data. External electronics or a processor unit may receive the standardized output pulses transmitted at the step 914 and may analyze the pulse data to determine characteristics of the material through which the radiation passed. The determined characteristics may include levels, locations, or densities of fluids, solids, emulsions, or other materials located within reservoirs, tanks, or pipes. The rate at which standardized output pulses are received may be correlated with the amount of radiation reaching the detector assembly, which may in turn be correlated with the characteristics of the material under measurement. The processor unit may facilitate display or transmission of data or signals identifying the determined characteristics at the step 916.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein but can be employed in any number of applications and equivalent devices by those of ordinary skill in the art. Rather it is hereby intended the scope of the invention be defined by the claims appended hereto.

The invention claimed is:

1. A scintillation detector assembly, comprising:

a detector housing;

a scintillation crystal positioned within the detector housing;

a photomultiplier tube optically coupled to the scintillation crystal;

a circuit board assembly positioned within the detector housing and electrically connected to the photomultiplier tube, the circuit board assembly comprising a single printed circuit board integrating:

a high voltage power supply circuit comprising a step-up transformer that is shielded and tied to ground, a preamplifier circuit, and a pulse processing circuit comprising a dual monostable multivibrator configuration implementing dead time control to prevent double-counting of single radiation events, wherein the single printed circuit board maintains electrical isolation between the high voltage power supply circuit and the preamplifier circuit, and wherein the single printed circuit board uses point grounds in a starred configuration; and a shield positioned adjacent to the photomultiplier tube.

2. The scintillation detector assembly of claim 1, wherein the single printed circuit board comprises curved trace routing patterns interconnecting electronic components.

3. The scintillation detector assembly of claim 1, wherein the dual monostable multivibrator configuration comprises:

a first monostable multivibrator configured to generate a pulse of defined width when triggered by a discriminator pulse; and a second monostable multivibrator configured to produce a final standardized output pulse when triggered by an output from the first monostable multivibrator.

4. The scintillation detector assembly of claim 1, wherein the circuit board assembly further comprises an interface circuit including a precision temperature transducer configured to generate a current proportional to absolute temperature.

5. The scintillation detector assembly of claim 1, further comprising a compression spring positioned to provide compression force between the photomultiplier tube and the circuit board assembly.

6. The scintillation detector assembly of claim 1, wherein the detector housing comprises an explosion-proof rating.

7. The scintillation detector assembly of claim 1, further comprising an annular housing configured to receive the shield.

8. The scintillation detector assembly of claim 7, wherein the annular housing comprises an internally threaded opening.

9. The scintillation detector assembly of claim 1, further comprising an optical coupling positioned between the scintillation crystal and the photomultiplier tube.

10. The scintillation detector assembly of claim 1, wherein the high voltage power supply circuit comprises a dual operational amplifier configuration with MOSFET inputs arranged as an oscillator configured to drive the step-up transformer.

11. The scintillation detector assembly of claim 1, wherein the high voltage power supply circuit comprises a feedback path comprising a voltage divider network configured to sample the high voltage output and maintain isolation between the high voltage power supply circuit and low voltage components on the single printed circuit board.

12. A circuit board assembly for a scintillation detector, comprising:

a single printed circuit board;

a high voltage power supply circuit disposed on the single printed circuit board and configured to generate a regulated high voltage output for a photomultiplier tube, the high voltage power supply circuit comprising a step-up transformer that is shielded and tied to ground;

a preamplifier circuit disposed on the single printed circuit board and configured to receive and amplify signals from the photomultiplier tube;

a pulse processing circuit disposed on the single printed circuit board and configured to generate output pulses, the pulse processing circuit comprising a dual monostable multivibrator configuration implementing dead time control to prevent double-counting of single radiation events; and a voltage regulation circuit disposed on the single printed circuit board, wherein the single printed circuit board maintains electrical isolation between the high voltage power supply circuit and the preamplifier circuit, and wherein the single printed circuit board uses point grounds in a starred configuration.

13. The circuit board assembly of claim 12, wherein the single printed circuit board comprises curved trace routing patterns.

14. The circuit board assembly of claim 12, further comprising an interface circuit disposed on the single printed circuit board, the interface circuit comprising:

a connector providing interface points for detector signals and power connections; and a precision temperature transducer configured to generate a current proportional to absolute temperature.

15. The circuit board assembly of claim 12, further comprising a discriminator circuit disposed on the single printed circuit board and configured to compare signals against a threshold.

16. The circuit board assembly of claim 12, wherein the pulse processing circuit comprises an intermediate stage positioned between a first monostable multivibrator and a second monostable multivibrator of the dual monostable multivibrator configuration, the intermediate stage comprising Schottky diodes and parallel resistors forming a pulse steering network.

17. The circuit board assembly of claim 12, wherein the pulse processing circuit comprises a final output stage comprising N-channel enhancement-mode MOSFETs configured to produce standardized output signals.

18. A method for detecting radiation through a material under measurement, comprising:

emitting radiation from a radiation source through the material under measurement;

detecting a scintillation event at a crystal positioned within a detector assembly;

converting scintillation light to an electrical signal via a photomultiplier tube;

processing the electrical signal at a circuit board assembly comprising a single printed circuit board integrating a preamplifier circuit, a pulse processing circuit comprising a dual monostable multivibrator configuration implementing dead time control to prevent double-counting of single radiation events, and a high voltage power supply circuit comprising a step-up transformer that is shielded and tied to ground, wherein the single printed circuit board maintains electrical isolation between the high voltage power supply circuit and the preamplifier circuit, and wherein the single printed circuit board uses point grounds in a starred configuration;

generating an output pulse at the pulse processing circuit; and determining material characteristics based on the output pulse.

19. The method of claim 18, wherein the material characteristics comprise at least one of levels, locations, or densities of fluids, solids, or emulsions located within reservoirs, tanks, or pipes.

20. The method of claim 18, further comprising providing regulated high voltage to the photomultiplier tube from a high voltage power supply circuit disposed on the single printed circuit board.

* * * * *